(12) United States Patent
von Hayn et al.

(10) Patent No.: US 8,985,714 B2
(45) Date of Patent: *Mar. 24, 2015

(54) BREAK ACTUATING UNIT FOR ACTUATING A MOTOR VEHICLE BRAKE SYSTEM

(75) Inventors: Holger von Hayn, Bad Vilbel (DE); Jürgen Schonlau, Walluf (DE); Manfred Rüffer, Sulzbach (DE); Wolfgang Ritter, Oberursel (DE); Holger Kranlich, Karben (DE); Jose Gonzalez, Bad Oeynhausen (DE); Thomas Sellinger, Offenbach (DE); Milan Klimes, Zornheim (DE); Torsten Queiβer, Frankfurt (DE); Michael Haber, Berlin (DE)

(73) Assignee: Continental Teves AG & Co. OHG, Frankfurt ( * ) Notice: Subject to any disclaimer, the term of this patent is extended or adjusted under 35 U.S.C. 154(b) by 0 days.

This patent is subject to a terminal disclaimer.

(21) Appl. No.: 13/461,839

(22) Filed: May 2, 2012

(65) Prior Publication Data

US 2013/0113271 A1    May 9, 2013

Related U.S. Application Data

(63) Continuation of application No. 10/567,416, filed as application No. PCT/EP2004/051681 on Jul. 30, 2004, now abandoned.

(30) Foreign Application Priority Data

| Aug. 6, 2003 | (DE) | 10 335 924 |
|---|---|---|
| Aug. 19, 2003 | (DE) | 10 337 949 |
| Nov. 7, 2003 | (DE) | 10 351 991 |
| Nov. 7, 2003 | (DE) | 10 351 992 |
| Nov. 10, 2003 | (DE) | 10 352 364 |
| Jan. 13, 2004 | (DE) | 10 2004 001 737 |
| Jan. 13, 2004 | (DE) | 10 2004 001 738 |
| Mar. 10, 2004 | (DE) | 10 2004 011 622 |

(51) Int. Cl.
*B60T 8/60* (2006.01)
*B60T 13/12* (2006.01)
(Continued)

(52) U.S. Cl.
CPC .................. *B60T 13/12* (2013.01); *B60T 7/042* (2013.01); *B60T 8/4077* (2013.01); *B60T 7/06* (2013.01); *B60T 13/66* (2013.01)
USPC ..................... 303/155; 303/113.3; 303/113.4; 74/512; 74/513

(58) Field of Classification Search
USPC .................. 303/20, 113.3, 113.4, 114.3, 155; 74/512, 513
See application file for complete search history.

(56) References Cited

U.S. PATENT DOCUMENTS 2,472,695 A * 6/1949 Chouings .................... 60/418
3,978,669 A 9/1976 Belart
(Continued)

FOREIGN PATENT DOCUMENTS

| DE | 3641475 | 6/1988 |
|---|---|---|
| DE | 19543583 | 2/1997 |

(Continued)

*Primary Examiner* — Robert A Siconolfi
*Assistant Examiner* — Mahbubur Rashid

(57) ABSTRACT

Disclosed is a brake actuating unit for actuating a motor vehicle brake system of the 'brake-by-wire' type. The system includes a brake booster which is operable in response to the driver's wish both by a brake pedal and by an electronic control unit. A device is provided to decouple a force-transmitting connection between the brake pedal and the brake booster in the 'brake-by-wire' operating mode. A master brake cylinder connected downstream of the brake booster, a device to detect a deceleration request of the driver, and a pedal travel simulator which interacts with the brake pedal and due to which a resetting force acting on the brake pedal can be simulated in the 'brake-by-wire' operating mode independently of an actuation of the brake booster, and which can be enabled in the 'brake-by-wire' operating mode when the force-transmitting connection between the brake pedal and the brake booster is decoupled and can be disabled outside the 'brake-by-wire' operating mode. The pedal travel simulator (2) is enabled and disabled by electromechanical means (22, 25), electrohydraulic means (40, 47) or pneumatically operable means (96 to 98).

13 Claims, 21 Drawing Sheets

(51) Int. Cl.
   *B60T 7/04*    (2006.01)
   *B60T 8/40*    (2006.01)
   *B60T 7/06*    (2006.01)
   *B60T 13/66*   (2006.01)

(56)              References Cited

U.S. PATENT DOCUMENTS

| 4,206,605 | A | * | 6/1980  | Mehren et al. ............. 60/545 |
| 4,620,750 | A | * | 11/1986 | Leiber ..................... 303/113.4 |
| 4,659,153 | A | * | 4/1987  | Klein ...................... 303/114.3 |
| 6,253,635 | B1 |  | 7/2001  | Huber |
| 2006/0163941 | A1 |  | 7/2006 | Von Hayn et al. |
| 2008/0217122 | A1 |  | 9/2008 | Von Hayn et al. |

FOREIGN PATENT DOCUMENTS

| DE | 19543698 | | 3/1997 |
| DE | 19750977 | | 6/1999 |
| DE | 19902444 | | 7/2001 |
| DE | 10223799 | | 5/2003 |
| DE | 10159788 | | 6/2003 |
| DE | 10230865 | | 2/2004 |
| EP | 1738983 A2 | * | 1/2007 |
| WO | 95/28307 | | 10/1995 |

* cited by examiner

BREAK ACTUATING UNIT FOR ACTUATING A MOTOR VEHICLE BRAKE SYSTEM

This is a continuation of U.S. application Ser. No. 10/567,416 filed Apr. 23, 2008, which is a National Phase of International Application No. PCT/EP04/51681 filed Jul. 30, 2004, which claims priority to German Patent Application Number 10 2004 011 622.9 filed Mar. 10, 2004, German Patent Application 10 2004 001 737.9 filed Jan. 13, 2004, German Patent Application 10 2004 001 738.7 filed Jan. 13, 2004, German Patent Application 103 52 364.2 filed Nov. 10, 2003, German Patent Application 103 51 992.0 filed Nov. 7, 2003, German Patent Application 103 51 991.2 filed Nov. 7, 2003, German Patent Application 103 37 949.5 filed Aug. 19, 2003 and German Patent Application 103 35 924.9 filed Aug. 6, 2003.

BACKGROUND OF THE INVENTION

The present invention relates to a brake actuating unit for actuating a motor vehicle brake system of the 'brake-by-wire' type comprising:

a) a brake booster which is operable in response to the driver's wish both by means of a brake pedal and by means of an electronic control unit, and a means is provided to decouple a force-transmitting connection between the brake pedal and the brake booster in the 'brake-by-wire' operating mode, b) a master brake cylinder connected downstream of the brake booster, c) a means to detect a deceleration request of the driver, and d) a pedal travel simulator which interacts with the brake pedal and due to which a resetting force acting on the brake pedal can be simulated in the 'brake-by-wire' operating mode independently of an actuation of the brake booster, and which can be enabled in the 'brake-by-wire' operating mode when the force-transmitting connection between the brake pedal and the brake booster is decoupled and can be disabled outside the 'brake-by-wire' operating mode.

An actuating unit of this type is disclosed in DE 197 50 977 A1. The pedal travel simulator in the prior art brake actuating unit cooperates with a two-part piston operable by the brake pedal, the piston parts thereof being isolated from each other so that their mechanical decoupling can be realized in the 'brake-by-wire' operating mode. A component furnished with a slope is displaceably arranged on the first piston part associated with the brake pedal, said component being moveable into engagement with another component on which a simulator spring is supported. The second piston part is in a force-transmitting connection with a movable wall of the brake booster. The pedal travel simulator is enabled by the component furnished with the slope engaging the additional component used to support the simulator spring. In emergency situations, for example, in power failure, mechanical connection between the two piston parts is established, whereby the pedal travel simulator is disabled.

It is, however, disadvantageous in the prior art actuating unit that force transmission does not take place between the first piston part and the sloped component at high brake pedal depression speeds so that the pedal travel simulator is not enabled. Further, a change from 'high-µ' to 'low-µ' causes uncoupling of the pedal travel simulator and coupling of the brake booster to the brake pedal, with the result that abrupt changes in force can be felt at the brake pedal.

SUMMARY OF THE INVENTION

In view of the above, an object of the invention is to disclose a brake actuation mode of the type mentioned hereinabove where it is ensured that the pedal travel simulator is reliably enabled at high brake pedal depression speeds.

According to the invention, this object is achieved by a brake actuating unit for a "brake-by-wire" system having the features indicated below. The electromechanical and the electrohydraulic means can be driven by the electronic control unit, while the pneumatic means can be operated by a vacuum source provided in the vehicle.

In a favorable improvement of the solution, the pedal travel simulator includes a movable simulator unit which receives at least one simulator spring, with the electromechanical means being formed of a supporting surface for the simulator unit and an electromagnet, and with the supporting surface being maintained by the activated electromagnet in engagement with the simulator unit and allowing a translational motion of the simulator unit when the electromagnet is inactive. The supporting surface is designed at a swiveling lever pivoted within limits.

The swiveling lever is preferably supported in a point which is arranged outside the longitudinal axis of the simulator spring.

In another advantageous improvement of the above-mentioned invention, the swiveling lever is configured as a power-transmitting lever. This provision achieves that only a low amount of retaining force, to be generated by the electromagnet, is necessary with very high simulator spring forces.

A variable arrangement of the pedal travel simulator is rendered possible in another design version of the subject matter of the invention because the pedal travel simulator is not arranged in the flux of forces between the brake pedal and the brake booster.

In another favorable improvement of the solution, the pedal travel simulator includes a movable simulator unit which receives at least one simulator spring, with the electromechanical means being formed of a supporting surface for the simulator spring and an arresting element or transverse slide operable by means of an electromagnet, and with the supporting surface being designed in the simulator unit which is arrested by the arresting element in the 'brake-by-wire' operating mode, while it is released outside the 'brake-by-wire' operating mode. It is achieved by this provision that the total actuating force is available to the brake system in the so-called fallback mode (outside the 'brake-by-wire' operating mode.

In another favorable embodiment of the subject matter of the invention, a cylindrical component is provided which accommodates at least in part a control housing of the brake booster, which contains a pneumatic control valve, the pedal travel simulator, and a resetting spring biasing the pedal travel simulator in opposition to its actuating direction. The mentioned cylindrical component can be manufactured in a particularly low-cost manner and safeguards a reliable guiding of the pedal travel simulator, in particular during its translational motion outside the 'brake-by-wire' operating mode.

A design version which can also be manufactured at low cost and operates very reliably is characterized in that the simulator spring is configured as at least one leaf spring which is compressed in an angular lever that is rotatable within limits coaxially relative to the brake pedal and that the electromechanical means is formed of an arm of the angular lever and an arresting element operable by means of an electromagnet and preventing the angular lever from moving in the 'brake-by-wire' operating mode. It is especially favorable when the angular lever is equipped with an elastic damping means which is used as a stop for the simulator spring and safeguards a progressive characteristic curve of the simulator spring.

In another favorable improvement of the invention, the pedal travel simulator is arranged in the flux of forces between the brake pedal and the brake booster, preferably coaxially relative to said. This provision allows taking influence on the brake booster when the pedal travel simulator cannot be deactivated in the event of a defect.

In a favorable improvement of the solution where the pedal travel simulator includes at least one simulator spring, the electrohydraulic means is formed of a hydraulic cylinder-and-piston arrangement that is closable by means of an electromagnetically, pneumatically or electro-pneumatically operable valve, and a force-transmitting element is interposed between the piston of the cylinder-and-piston arrangement and the simulator spring, abutting on which element is a supporting surface for the simulator spring. The use of the electrohydraulic means renders it possible to accommodate very great actuating forces, while little mounting space is required. The piston-and-cylinder arrangement and the force-transmitting element are preferably arranged in a manner radially offset relative to the axis of the brake booster. A design is particularly suitable in which the piston-and-cylinder arrangement is disposed in the engine compartment of the motor vehicle. It is achieved by the last-mentioned measure that, while there is a 'dry' system in the vehicle interior, the hydraulic components are accessible and connectable (e.g. to a pressure fluid tank) from the engine compartment.

In another appropriate design version of the invention, the piston-and-cylinder arrangement includes a resetting spring preloading the force-transmitting element in opposition to the actuating direction of the brake pedal. The resetting spring resets the pedal travel simulator into its initial position after the brake operation has been completed.

Another favorable improvement of the subject matter of the invention resides in that the brake booster is a pneumatic brake booster which includes at least one force-transmitting pin that extends through the booster housing and has a through-bore in which the force-transmitting element is received. Using the force-transmitting pin which is already provided for the passage through the splashboard also for other purposes renders it possible to maintain the flange pattern of the splashboard in a manner unmodified to the largest possible extent.

The simulator spring can be designed as at least one leaf spring or at least one compression spring which is compressed between the brake pedal and an angular lever that is mounted so as to be rotatable within limits coaxially in relation to the brake pedal and is supported on the force-transmitting element. The simulator spring can be arranged in the cylinder-and-piston arrangement and can be supported on the piston of the cylinder-and-piston arrangement. Further, a means to sense the position of the piston can be provided. This means is used to sense the driver's deceleration request. In addition, a deviation of the zero position of the piston, e.g. in the case of leakage, can be sensed, thereby allowing a warning to be given to the driver.

The mounting space required for the installation of the brake actuating unit of the invention is optimized because the simulator spring is accommodated in a simulator unit which is arranged in the passenger compartment of the vehicle in a way radially offset relative to the axis of the brake booster.

In another embodiment, the simulator spring is received in a simulator unit which is arranged in the flux of forces between the brake pedal and the brake booster, preferably coaxially to said. This arrangement accomplishes in particular advantages outside the 'brake-by-wire' operating mode, e.g. upon power failure, because the brake booster can be actuated after a short travel by way of the simulator spring.

In another design version, the simulator unit is configured as a hydraulic piston and forms a closable hydraulic chamber in a component which radially embraces at least the simulator unit. The hydraulic chamber is connected to one of the pressure chambers of the master brake cylinder or a pressure fluid tank associated with the master brake cylinder. A design of this type lends itself to ease of venting. Because low amounts of leakage are compensated by the pressure fluid tank, pressure fluid filling over the entire useful like is not necessary. Alternatively, the hydraulic chamber can be connected to a low-pressure accumulator.

According to a design version that allows low-cost manufacture, the above-mentioned component is configured as an adapter that radially embraces the brake booster at least in part and is used for the supply of air to the brake booster out of the engine compartment of the vehicle. This provision is advantageous in terms of costs because it is only necessary to integrate the hydraulic components in an adapter that is possibly provided already.

The hydraulic chamber is closable preferably by means of an electromagnetically, electro-pneumatically or pneumatically operable valve.

In another favorable improvement of the invention, the pedal travel simulator is formed of a hydraulic generating cylinder operable by means of the brake pedal and a hydraulic slave cylinder connected downstream of the generating cylinder and having its piston preloaded by the simulator spring, with the generating cylinder being closed by way of a connection to a low-pressure accumulator that can be closed by means of a valve. The above-mentioned pressure fluid transmission allows free selection of the spatial arrangement of the pistons, and the fallback mode is reached by operation of the valve. Besides, this produces a 'natural' hysteresis (due to friction of piston seals) which imparts a 'normal' pedal feel to the driver.

Preferably, the slave cylinder is designed in an adapter which radially embraces the brake booster at least in part and is used to supply air to the brake booster out of the engine compartment of the vehicle. Moreover, a means to sense the position of the slave cylinder piston is provided. The last-mentioned measure allows detecting a possible leakage in the hydraulic system and indicating it to the vehicle driver. Alternatively, a means to sense the pressure prevailing in the slave cylinder can be provided.

In another advantageous embodiment of the subject matter of the invention, the pedal travel simulator is formed of a simulator spring compressed between the brake pedal and a two-armed lever which is pivoted within limits, whose first arm forms the supporting surface for the simulator spring and whose second arm cooperates with a hydraulic piston of a piston-and-cylinder arrangement having its pressure chamber connected to a hydraulic low-pressure accumulator by way of a closable hydraulic connection.

The first arm preferably has an opening which, upon actuation of the brake booster outside the 'brake-by-wire' operating mode embraces the control housing of the brake booster at least in part. This measure allows a mounting support of the brake pedal close to the splashboard. Alternatively, the two-armed lever can be mounted coaxially to the brake pedal or offset with respect to the brake pedal.

It is especially suitable in the above-mentioned design when a means is provided to test the movability of the piston of the piston-and-cylinder arrangement.

The means for testing the movability of the piston is provided by a tension-force-transmitting connection between the brake pedal and the brake booster and a sensor device sensing the travel of the piston.

Alternatively, the means for testing the movability of the piston is formed of a driving unit which allows actuating the piston of the piston-and-cylinder arrangement irrespective of the brake pedal, and a sensor device sensing the travel of the piston. The driving unit can be configured as an electromechanical or pneumatic driving unit.

In a favorable improvement of the solution, the pedal travel simulator includes a movable simulator unit which receives at least one simulator spring, and the pneumatically operable means is formed of a supporting surface for the simulator spring being designed in the simulator unit as well as an arresting element which is operable by means of a vacuum box and arrests the simulator unit in the 'brake-by-wire' operating mode and releases it outside the 'brake-by-wire' operating mode.

A mechanical through grip taking effect on the brake booster when the deactivation system for the pedal travel simulator is jammed is achieved in that the pedal travel simulator is arranged in the flux of forces between the brake pedal and the brake booster, preferably coaxially in relation to said.

In addition, a cylindrical component may preferably be provided which accommodates at least in part a control housing of the brake booster that contains a pneumatic control valve, the pedal travel simulator, and a resetting spring preloading the pedal travel simulator in opposition to its actuating direction.

To permit exact proportioning of the brake force, the invention arranges for a means to produce a hysteresis.

The means to produce the hysteresis is preferably formed of a force-transmitting lever connected to the brake pedal and a friction member which abuts on the force-transmitting lever by the action of the simulator spring and cooperates with a friction surface.

In a favorable improvement of the subject matter of the invention, the force-transmitting lever and the friction member include inclined abutment surfaces which are so configured that a force component develops when the pedal travel simulator is actuated, urging the friction member against the friction surface.

As this occurs, it is especially advantageous that the friction member is arranged on a transmission lever being supported on the force-transmitting lever in such a fashion that boosting of the force component occurs which is produced upon actuation of the pedal travel simulator and urges the friction member against the friction surface.

Besides, the means to produce the hysteresis is arranged in a housing which is pivoted coaxially to the brake pedal on the axis of rotation thereof, with the housing having an arm that is supported on the means for activating and deactivating the pedal travel simulator.

Finally, it can be suitable in many applications in the vehicle that the brake pedal is adjustably arranged.

BRIEF DESCRIPTION OF THE DRAWINGS

Further features and advantages of the invention will be explained in detail in the following description by way of several embodiments, making reference to the accompanying drawings.

DETAILED DESCRIPTION OF THE DRAWINGS

Figure 1:
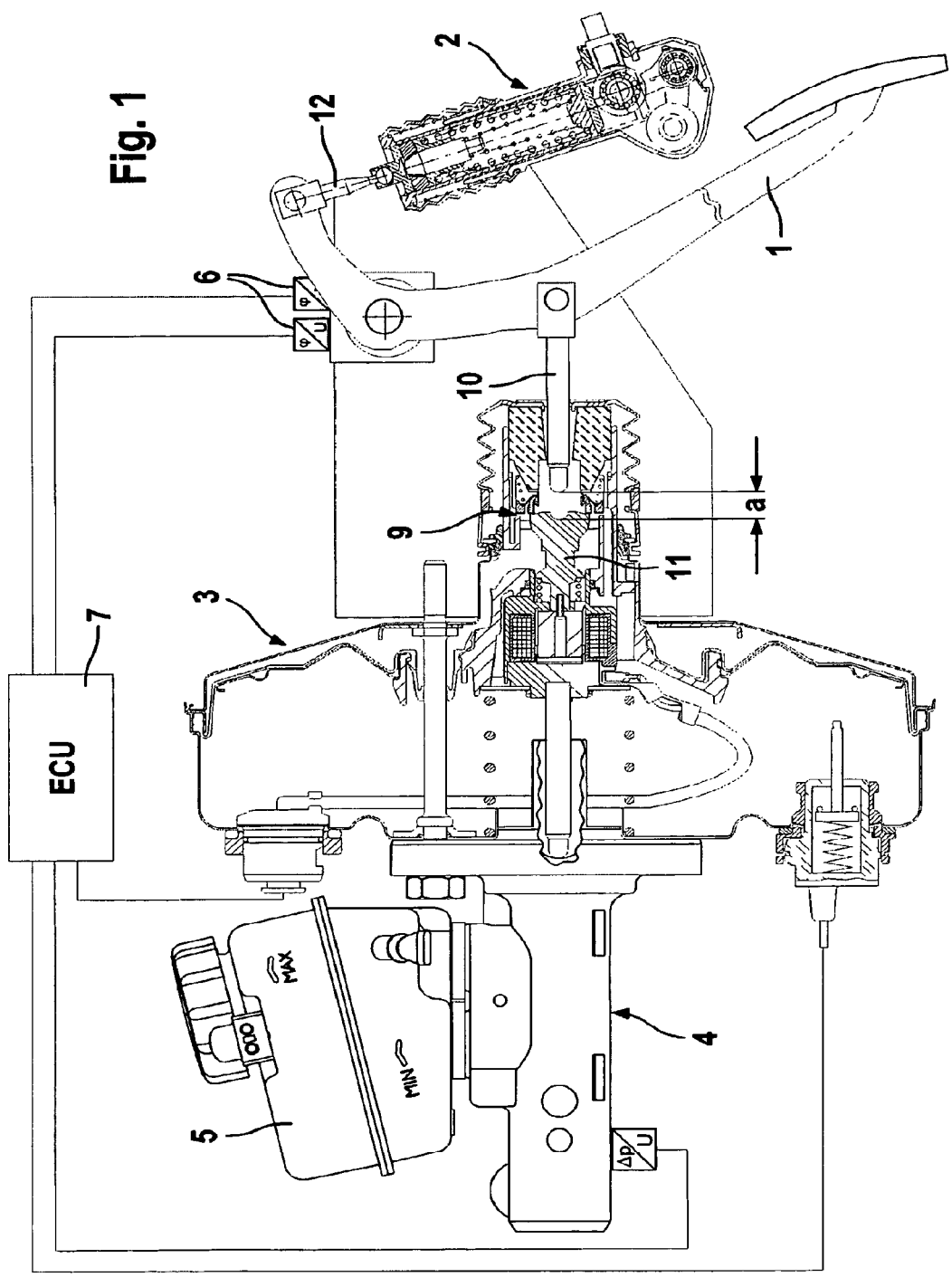
FIG. 1 is a partial cross-sectional view of a first design of the brake actuating unit of the invention, wherein the activation and deactivation of the pedal travel simulator is executed by electromechanical means.

The brake actuating unit shown in FIG. 1 in a partial cross-sectional view and intended for the actuation of a motor vehicle brake system of the 'brake-by-wire' type essentially comprises a brake booster, preferably a vacuum brake booster 3, a master brake cylinder connected downstream of the brake booster 3, preferably a tandem master cylinder 4, to the pressure chambers (not shown) of which wheel brakes (not shown) of a motor vehicle are connected, a pressure fluid tank 5 associated with the master brake cylinder 4, a brake pedal 1 for actuation of the brake booster 3 by the driver, a pedal travel simulator 2 which cooperates with the brake pedal 1, in particular in the 'brake-by-wire' operating mode and imparts the customary brake pedal feel to the driver, at least one sensor device 6 for sensing a driver's deceleration request, as well as an electronic control unit 7, the output signals of which enable, among others, actuation of an electromagnet 8 associated with the brake booster 3 and rendering it possible to actuate a pneumatic control valve 9 independently of the driver's wish, the said control valve controlling the supply of air to the brake booster 3. An axial slot 'a' provided between the end of a piston rod 10 coupled to the brake pedal 1 and a control piston 11 of the above-mentioned control valve 9 ensures decoupling the force-transmitting connection between the brake pedal 1 and the brake booster 3 in the 'brake-by-wire' operating mode. The pedal travel simulator 2 by which, as has been mentioned above, a resetting force acting on the brake pedal in the 'brake-by-wire' operating mode can be simulated irrespective of an actuation of the brake booster 3 is designed in such a fashion that it can be enabled in the 'brake-by-wire' operating mode when the force-transmitting connection between the brake pedal 1 and the brake booster 3 is decoupled, and can be disabled outside the 'brake-by-wire' operating mode. The pedal travel simulator 2 is actuated by means of an actuating member 12 articulated at the brake pedal 1. The activation and deactivation of the pedal travel simulator 2 is executed in the embodiment shown by electromechanical means being explained in detail with respect to FIG. 2.

Figure 2:
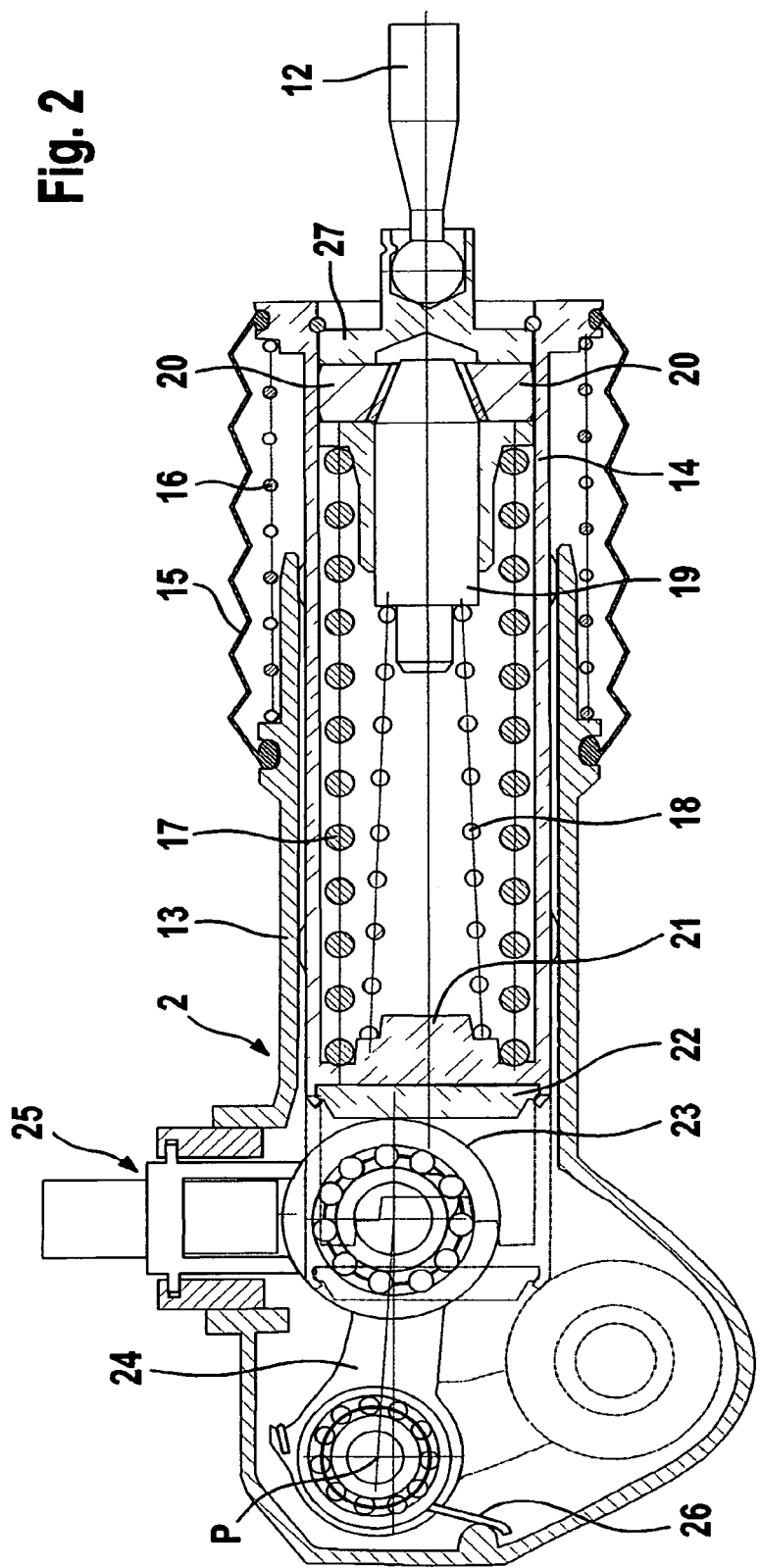
FIG. 2 shows an enlarged view of the pedal travel simulator used in the brake actuating unit of FIG. 1.

As can be taken from FIG. 2 in particular, the pedal travel simulator 2 includes a partly cylindrical outside housing 13 and a tubular simulator unit 14 which is guided so as to be displaceable in the outside housing 13. The part of the simulator unit 14 projecting from the outside housing 13 is embraced by an elastic pleated bellows 15, while a resetting spring 16 is interposed between the housing 13 and the simulator unit 14, being used to reset the simulator unit 14. The tubular simulator unit 14 receives a first simulator spring 17, a second simulator spring 18 arranged coaxially with the first simulator spring 17, a force-transmitting element 27 being in connection to the actuating member 12, as well as means or components 19, 20 used to produce a hysteresis by generating friction forces. The means 19, 20 to produce the hysteresis are designed in such a fashion that, with a rising stroke of the pedal travel simulator 2 in addition to the force of the simulator springs 17, 18, the mentioned friction forces are generated which counteract the actuating force exerted on the brake pedal 1, and the said means comprise a cylindrical part 19 provided with a conical surface and being displaceably guided in the force-transmitting element 18, as well as at least two friction segments 20 which interact with the inside wall of the simulator unit 14 and include slopes being brought into engagement with the conical surface of the cylindrical part 19. The two simulator springs 17, 18 are supported with one end on a wall 21 closing the simulator unit 14. The other end of the radially outward simulator spring 17 is supported on the above-mentioned force transmitting element 27, while the other end of the radially inward simulator spring 18 is supported on the cylindrical part 19 and, thus, biases this part 19 in opposition to the actuating direction of the pedal travel simulator 2.

As can further be taken from FIG. 2, the wall 21 closing the simulator unit 14 abuts on a supporting surface 23 by way of a preferably hardened metal plate 22, the said supporting surface being designed on a swiveling lever 24 which is pivoted within limits in the outside housing 13. The fulcrum P, in which the swiveling lever 24 is pivoted, is arranged so as to be radially offset with respect to the longitudinal axis of the simulator unit 14. The above-mentioned supporting surface 23 is preferably the surface of a ring of ferromagnetic material pivoted on the swiveling lever 24, said ring being retained in the position shown in the drawing by activating an electromagnet 25. A leg spring 26 acting on the swiveling lever 24 exerts a leftward turning torque on the swiveling lever 24 which, in the event of failure of the electromagnet 25, is overcome by the force introduced at the actuating member 12 so that the swiveling lever 24 is moved to adopt the position indicated in dotted lines in the drawing and, thus, the axial travel for the simulator unit 14 or for the wall 21 supporting the simulator springs 17, 18 is released and the pedal travel simulator 2 is disabled. The swiveling lever 24 or the supporting surface 22 form together with the electromagnet 25 the electromechanical means mentioned with respect to FIG. 1. The pedal travel simulator 2 is not disposed in the flux of forces between the brake pedal 1 and the brake booster 3 in the embodiment shown in FIG. 1.

Figure 3:
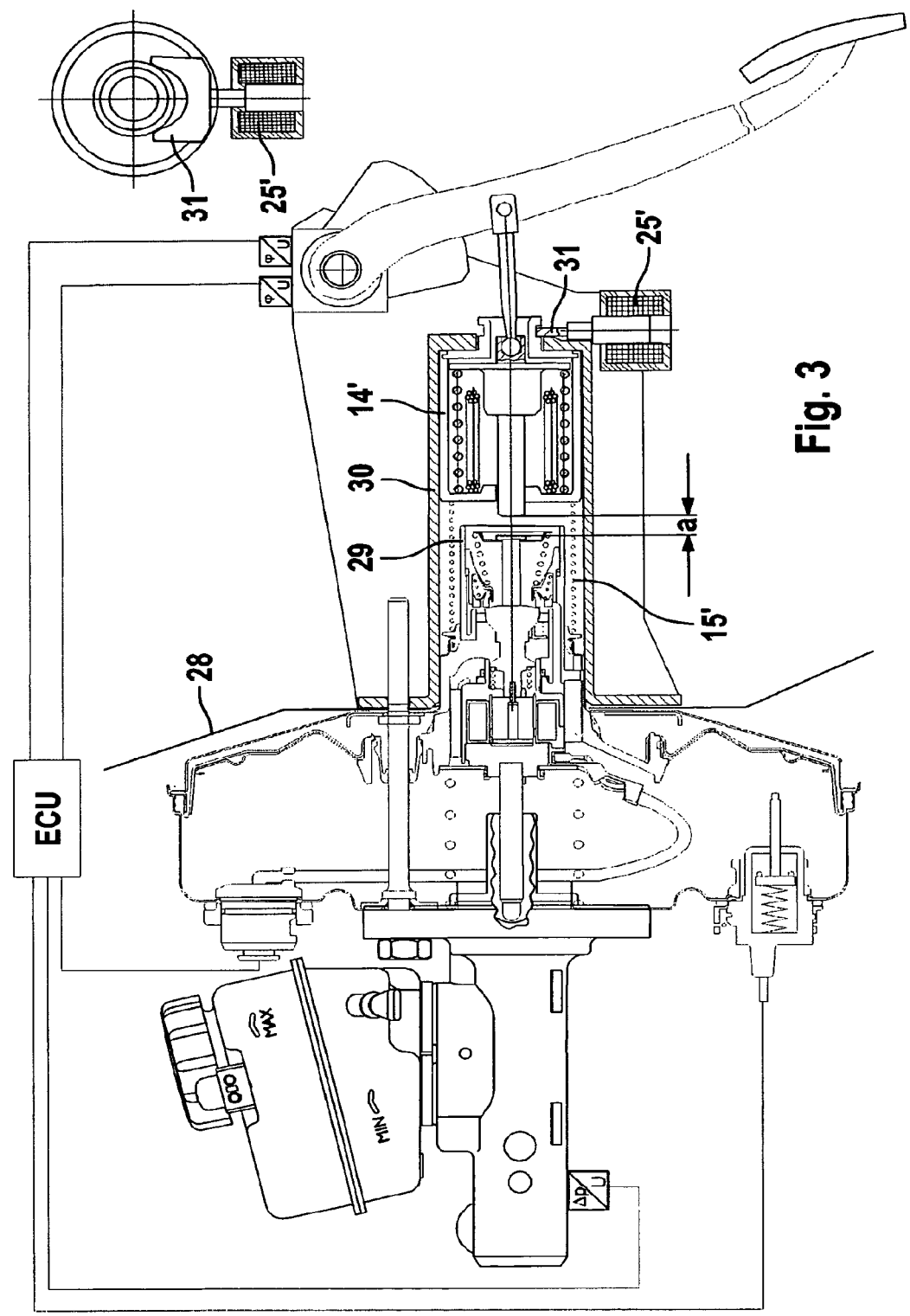
FIG. 3 shows a second design of the brake actuating unit of the invention in a representation corresponding to FIG. 1, where the activation and deactivation of the pedal travel simulator is executed by electromechanical means.

In the second design illustrated in FIG. 3, the pedal travel simulator 2 is arranged in the flux of forces between the brake pedal 1 and the brake booster 3 coaxially in relation to said. The above-mentioned simulator unit, which is designated by reference numeral 14' in FIG. 3, is displaceably mounted in a cylindrical component 30 that is secured to a splashboard 28 of the vehicle and embraces at least partly a control housing 29 of the brake booster 3 comprising a pneumatic control valve (not shown). Further, the cylindrical component 30 receives the above-mentioned resetting spring 15 that biases the simulator unit 14' in opposition to its actuating direction. The electromechanical means are formed of the simulator unit 14' and an arresting element operable by means of an electromagnet 25' or a transverse slide 31, arresting the simulator unit 14' in the 'brake-by-wire' operating mode and releasing it outside the 'brake-by-wire' operating mode, e.g. in power failure, so that it can be displaced in the cylindrical component 30 and a transmission of forces takes place between the brake pedal 1 and a valve piston actuating the control valve of the brake booster 3 after the slot 'a' mentioned with respect to FIG. 1 has been closed.

Figure 4:
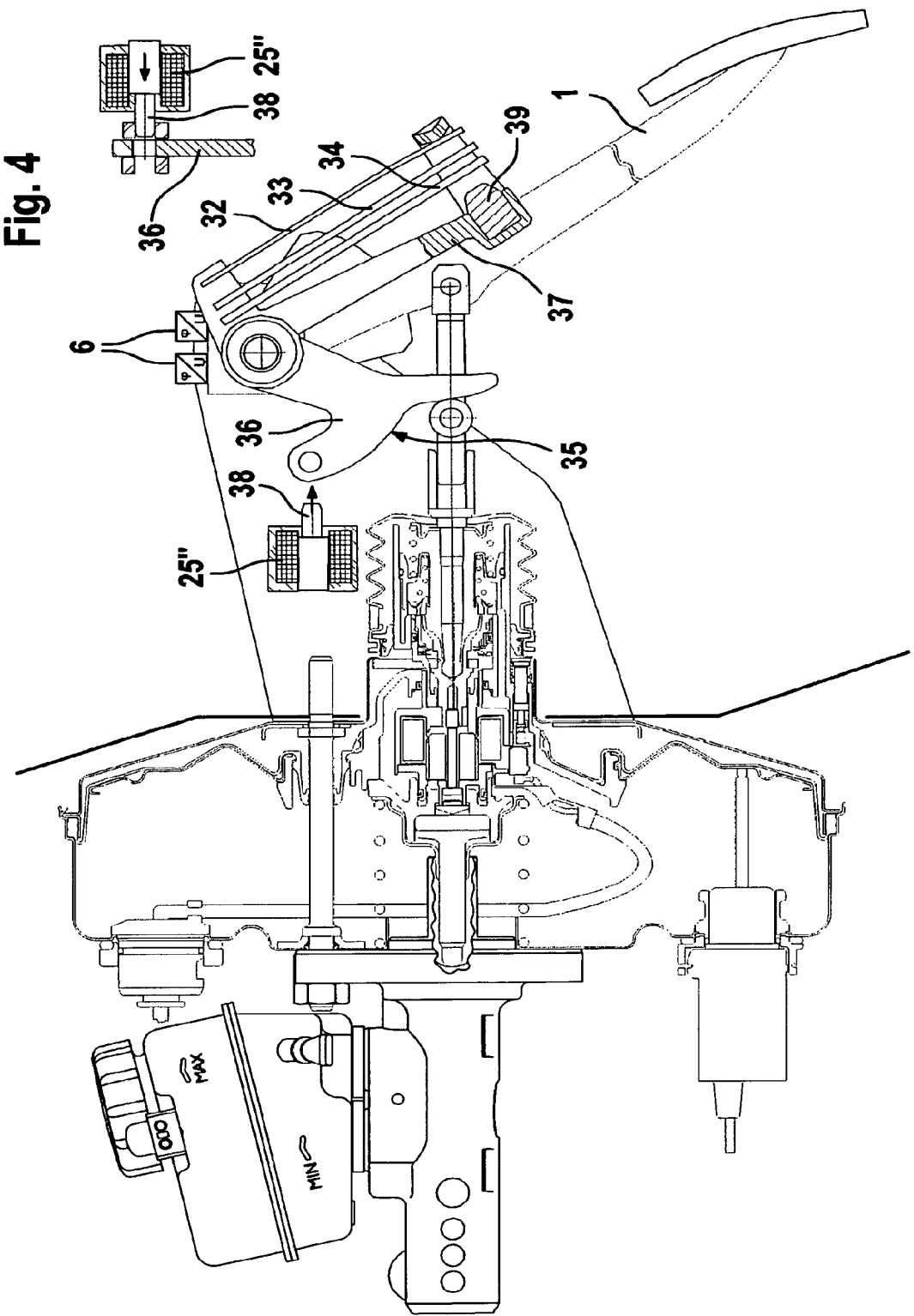
FIG. 4 shows a third design of the brake actuating unit of the invention in a representation corresponding to FIG. 1 or 2, where the activation and deactivation of the pedal travel simulator is executed by electromechanical means.

In the third design of the subject matter of the invention illustrated in FIG. 4, the pedal travel simulator 2 is substantially formed of leaf springs 32, 33, 34 being compressed in an angular lever 35. The angular lever 35 is pivoted within limits coaxially relative to the brake pedal 1 and has two arms 36, 37. The electromechanical means in the example shown are formed by the short arm 36 of the angular lever 35 and an arresting element 38 which is operable by an electromagnet 25" shown in a way turned by 90° in the drawings, and locks the angular lever 35 in the 'brake-by-wire' operating mode, thus, preventing its movement. The long arm 37 of the angular lever 35 includes an elastic block 39 forming a stop for the leaf springs 32 to 34.

As has been mentioned already hereinabove, FIGS. 5 to 14 show favorable improvements of the actuating unit of the invention, where the activation and deactivation of the pedal travel simulator 2 is executed by an electrohydraulic means which mainly is formed of a hydraulic cylinder-and-piston arrangement 40 that can be closed by means of an electromagnetically, pneumatically or electro-pneumatically operable valve. In the first design of this type shown in FIG. 5, a leaf spring 41 is used as a pedal travel simulator 2 and is fastened to the brake pedal 1, on the one hand, and to an angular lever 42 coaxially mounted relative to the brake pedal 1, on the other hand. Provided between a piston 43 of the cylinder-and-piston arrangement 40 and the angular lever 42 is a force-transmitting element 44 that extends through the brake booster 3.

As can be seen in the drawings, the brake booster 3 is a pneumatic brake booster having at least one force-transmitting pin 45 that extends through the booster housing. The force-transmitting pin 45 includes a through-bore which receives the force-transmitting element 44. The piston-and-cylinder arrangement 40 and the force-transmitting element 44 are arranged so as to be radially offset relative to the axis of the brake booster 3, and the piston-and-cylinder arrangement 40 is arranged in the engine compartment of the motor vehicle. The resetting spring 15, which has been mentioned in connection with the preceding explanations, is arranged in the piston-and-cylinder arrangement 40 in the illustrated example and biases its piston 43 in opposition to the actuating direction of the brake pedal 1. Piston 43 bounds a hydraulic chamber 46 that is connected to the above-mentioned pressure fluid tank 5. Inserted into the connection between the hydraulic chamber 46 and the pressure fluid tank 5 is an electromagnetically operable valve 47 which allows closing the mentioned connection. A pressure sensor 48 associated with the master brake cylinder 4, in addition to the travel sensor 6, is used to sense the driver's deceleration request.

Figure 5:
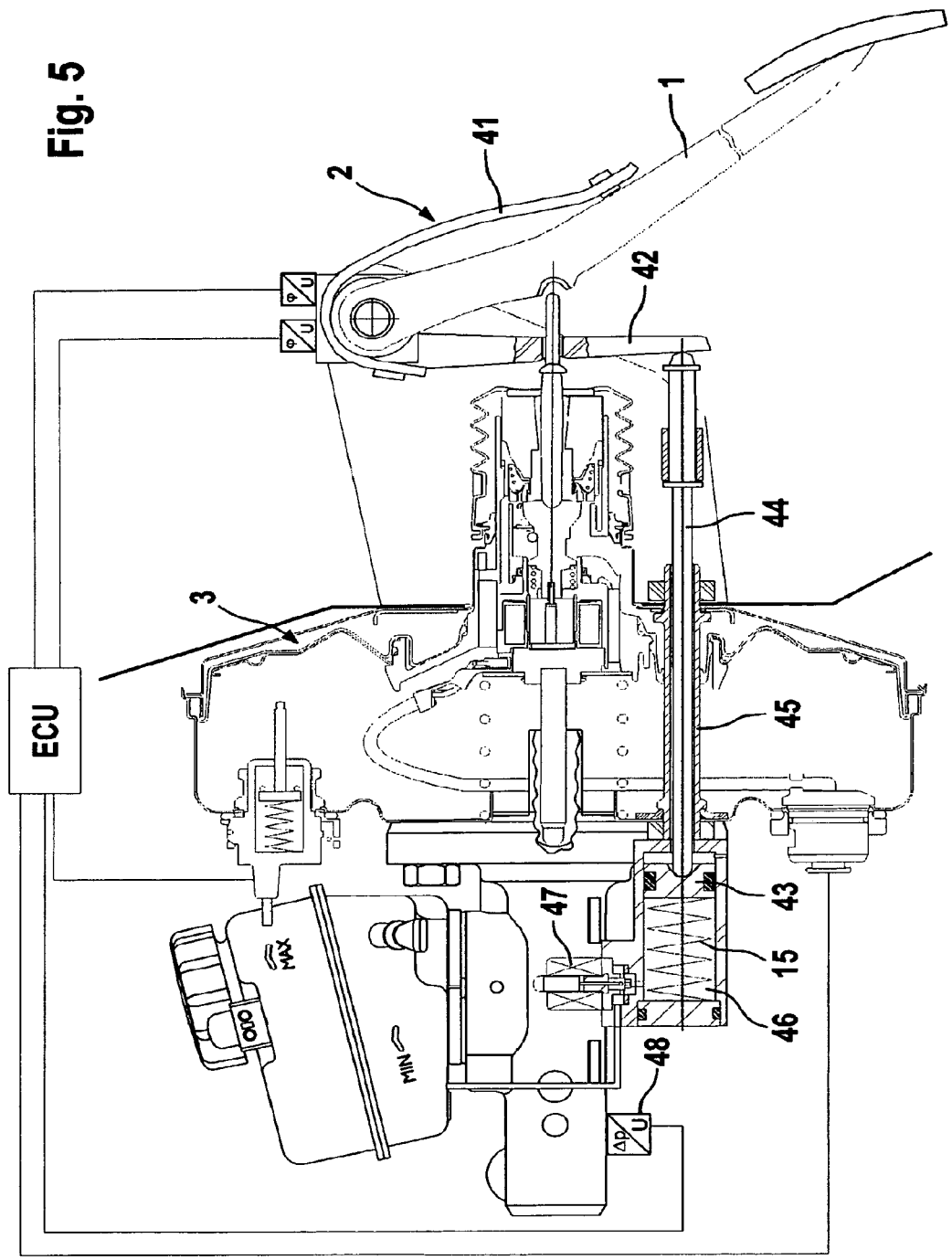
FIG. 5 shows a partial cross-sectional view of the brake actuating unit of the invention, where the activation and deactivation of the pedal travel simulator is executed by electrohydraulic means.
Figure 6:
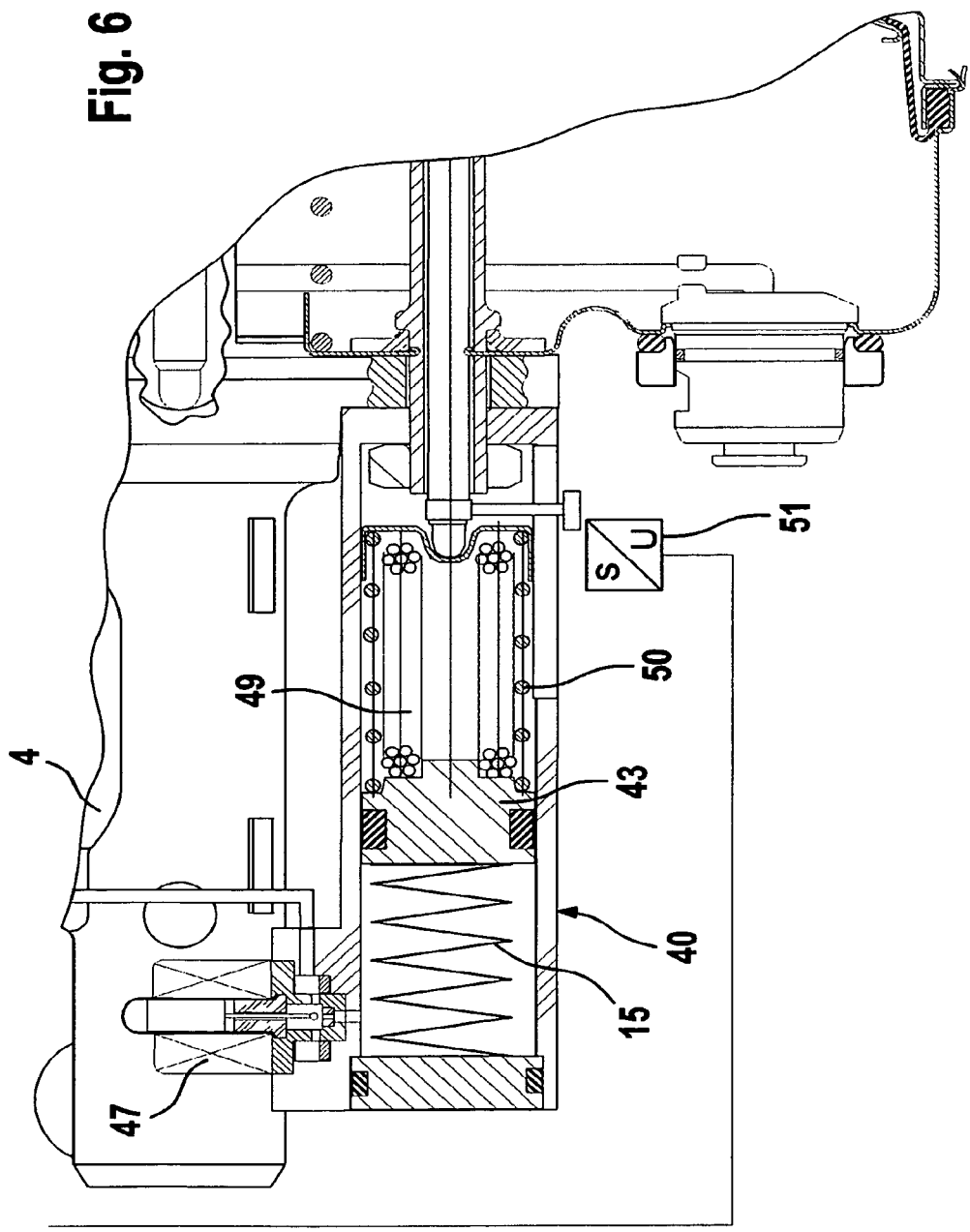
FIG. 6 shows a partial view of a second design of the brake actuating unit of the invention, where the activation and deactivation of the pedal travel simulator is executed by electrohydraulic means.

The structure of the design shown in FIG. 6 corresponds largely to the structure of the design according to FIG. 5. The pedal travel simulator 2 is, however, formed of two coaxial compression springs 49, 50 being integrated in the above-mentioned piston-and-cylinder arrangement 40. A travel sensor 52, designated by reference numeral 51, serves sensing the simulator movement.

Figure 7:
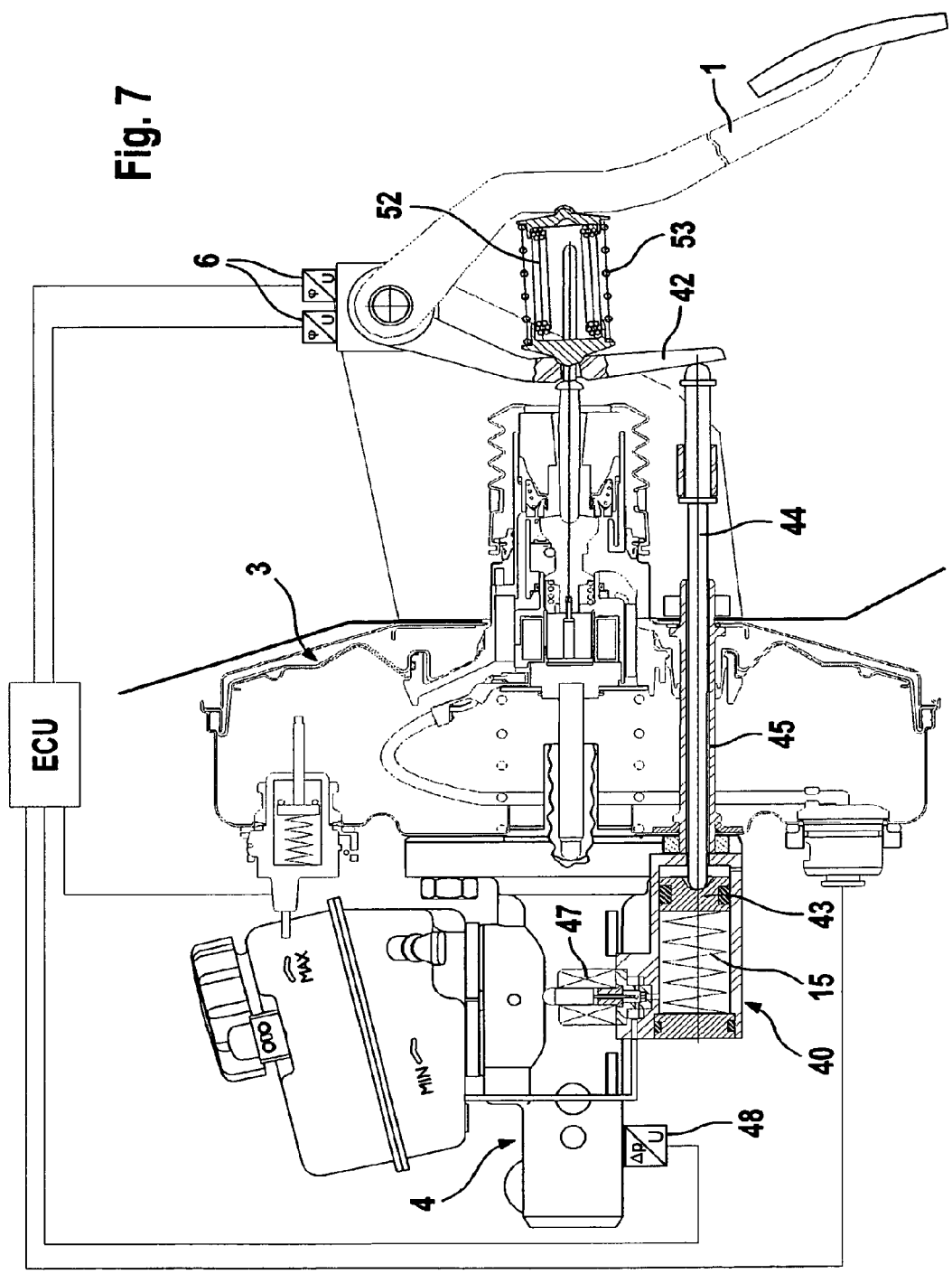
FIG. 7 shows a partial cross-sectional view of a third design of the brake actuating unit of the invention, where the activation and deactivation of the pedal travel simulator is executed by electrohydraulic means.

In the design illustrated in FIG. 7, the pedal travel simulator is formed of coaxially arranged spiral or compression springs 52, 53 which are compressed between the brake pedal 1 and the angular lever 42 mentioned with respect to the design of FIG. 5 and being supported on the force-transmitting element 44.

Figure 8A:
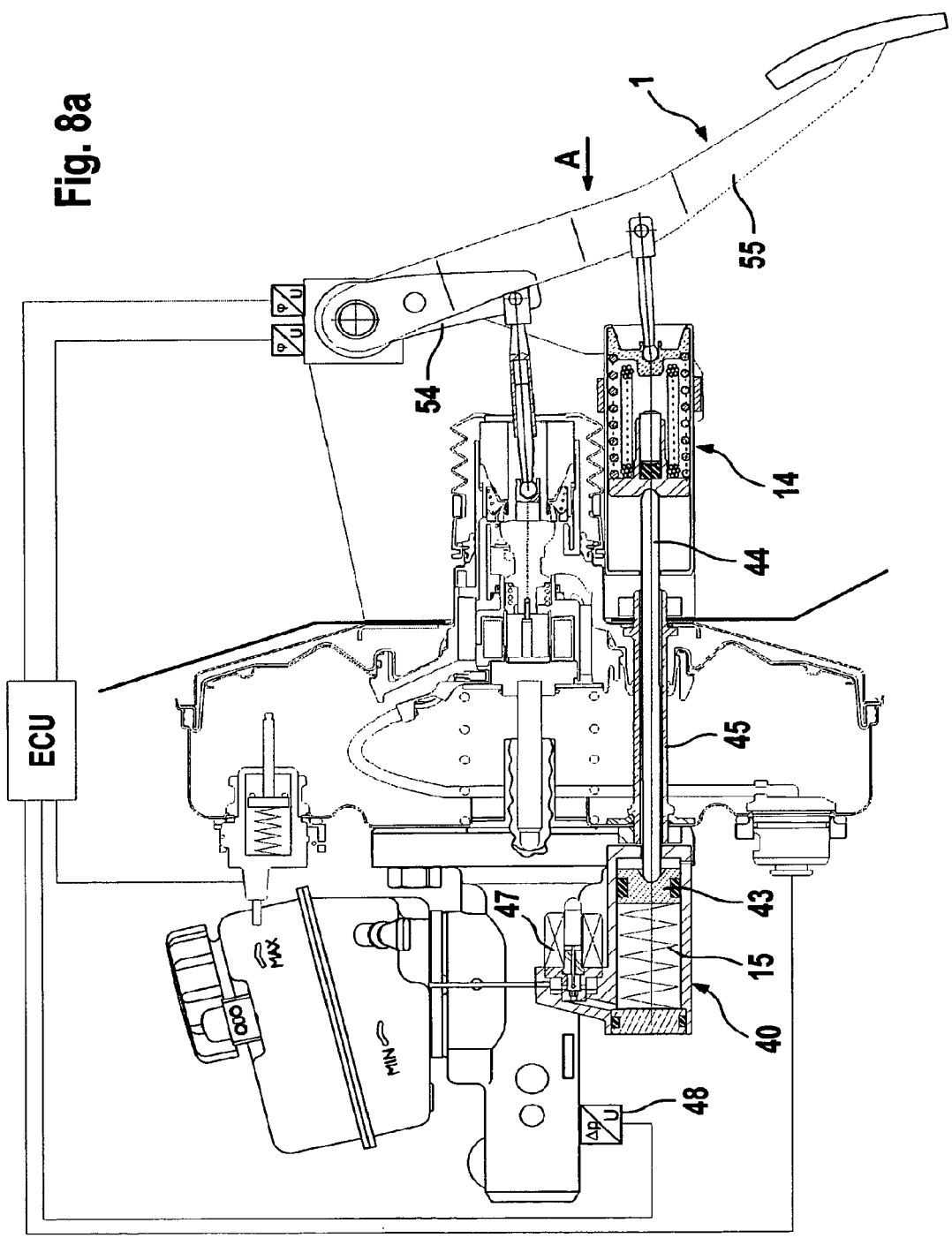
FIG. 8a shows a partial cross-sectional view of a fourth design of the brake actuating unit of the invention, where the activation and deactivation of the pedal travel simulator is executed by electrohydraulic means.
Figure 8B:
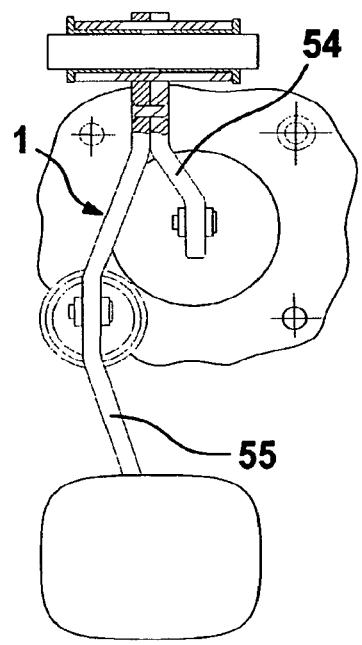
FIG. 8b shows a partial view of the brake actuating unit according to FIG. 8a from the direction 'A'.

In the embodiment shown in FIG. 8, the simulator unit 14 is arranged in the passenger compartment of the vehicle radially offset with regard to the longitudinal axis of the brake booster 3. In this arrangement, the brake pedal 1 includes two actuating arms 54, 55 arranged side by side and being individually used to actuate the brake booster 3 and the pedal travel simulator 2. With the exception of these distinctive features, the design shown corresponds to the design according to FIG. 7.

Figure 9:
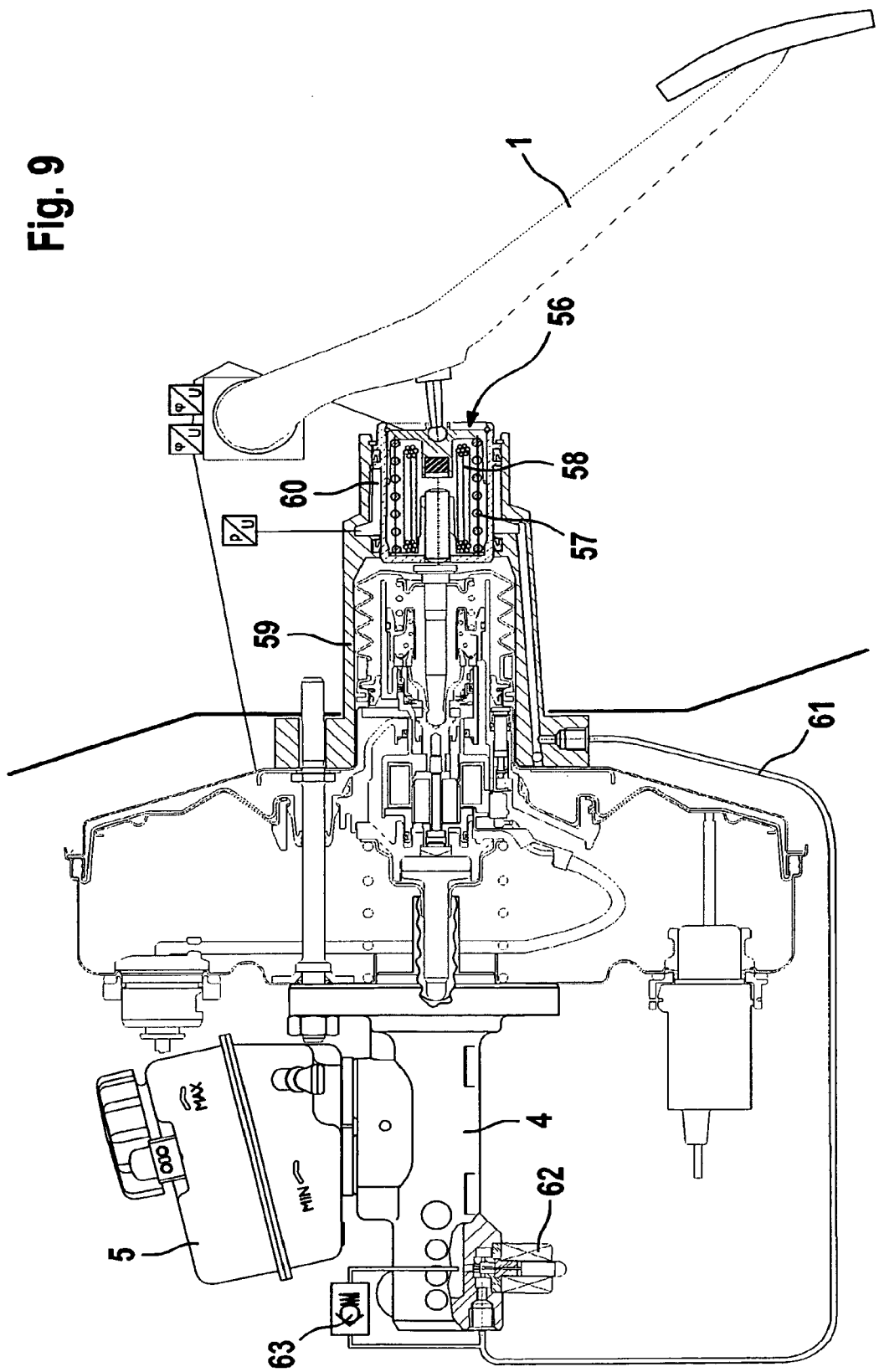
FIG. 9 shows a partial cross-sectional view of a fifth design of the brake actuating unit of the invention, where the activation and deactivation of the pedal travel simulator is executed by electrohydraulic means.

The actuating unit of the invention shown in FIG. 9 includes a cylindrical simulator unit 56 which receives two coaxially arranged simulator springs 57, 58 and is arranged in the flux of forces between the brake pedal 1 and the brake booster 3, preferably coaxially relative to said. The simulator unit 56 is advantageously designed as a hydraulic piston and delimits a closable hydraulic chamber 60 in a component 59 that radially embraces the simulator unit 56 and partly the brake booster 3. The component 59 can preferably be designed as an adapter used to supply air from the engine compartment of the vehicle to the control valve of the brake booster 3. The hydraulic chamber 60 is connected to one of the pressure chambers of the master brake cylinder 4 or the pressure fluid tank 5 associated with the master brake cylinder 4 by way of a hydraulic conduit 61 that is only represented.

The conduit 61 is closed by an electromagnetically operable valve 62, connected in parallel to which is a non-return valve 63 in the example shown.

Figure 10:
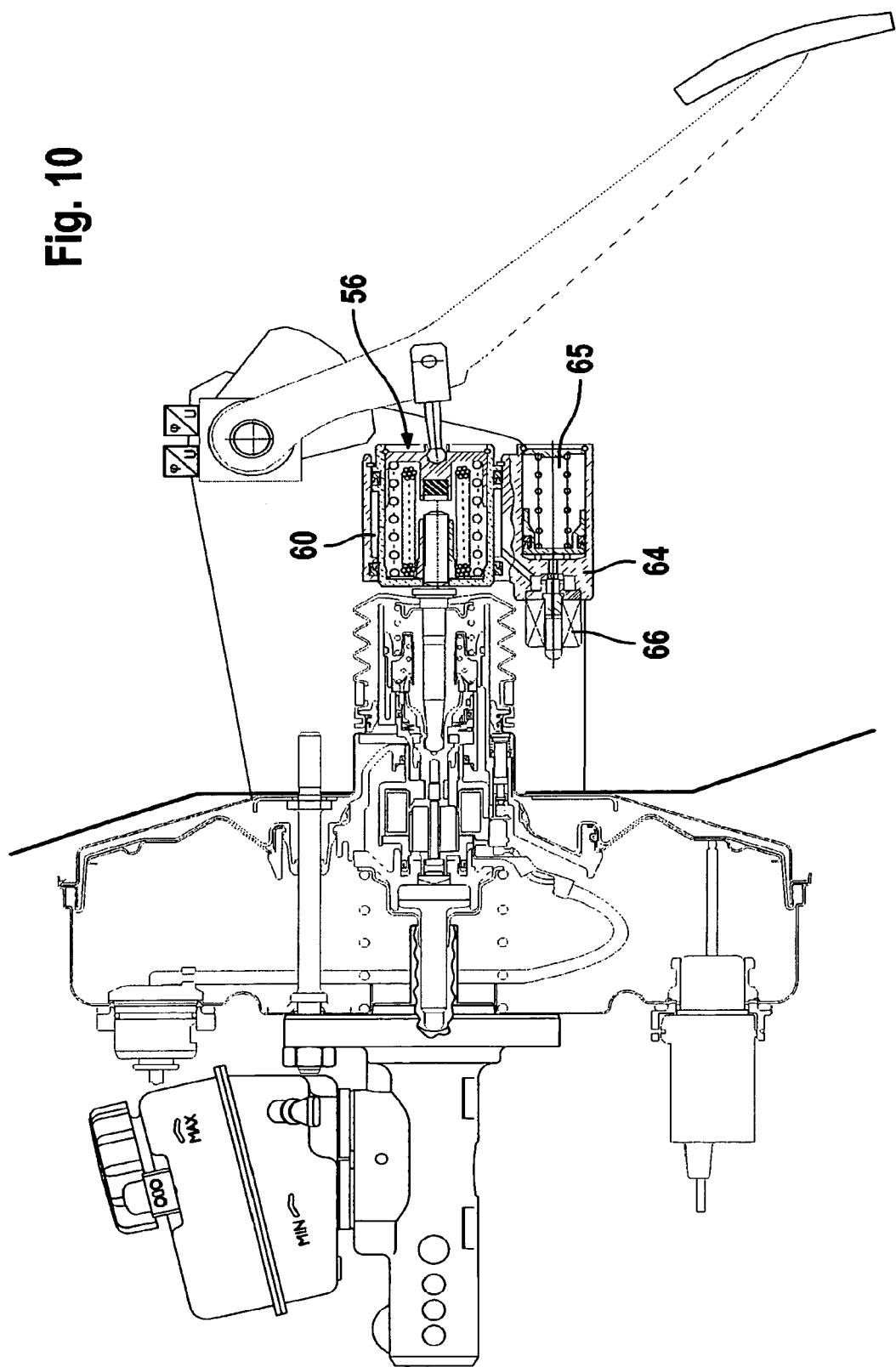
FIG. 10 shows a partial cross-sectional view of a sixth design of the brake actuating unit of the invention, where the activation and deactivation of the pedal travel simulator is executed by electrohydraulic means.
Figure 11:
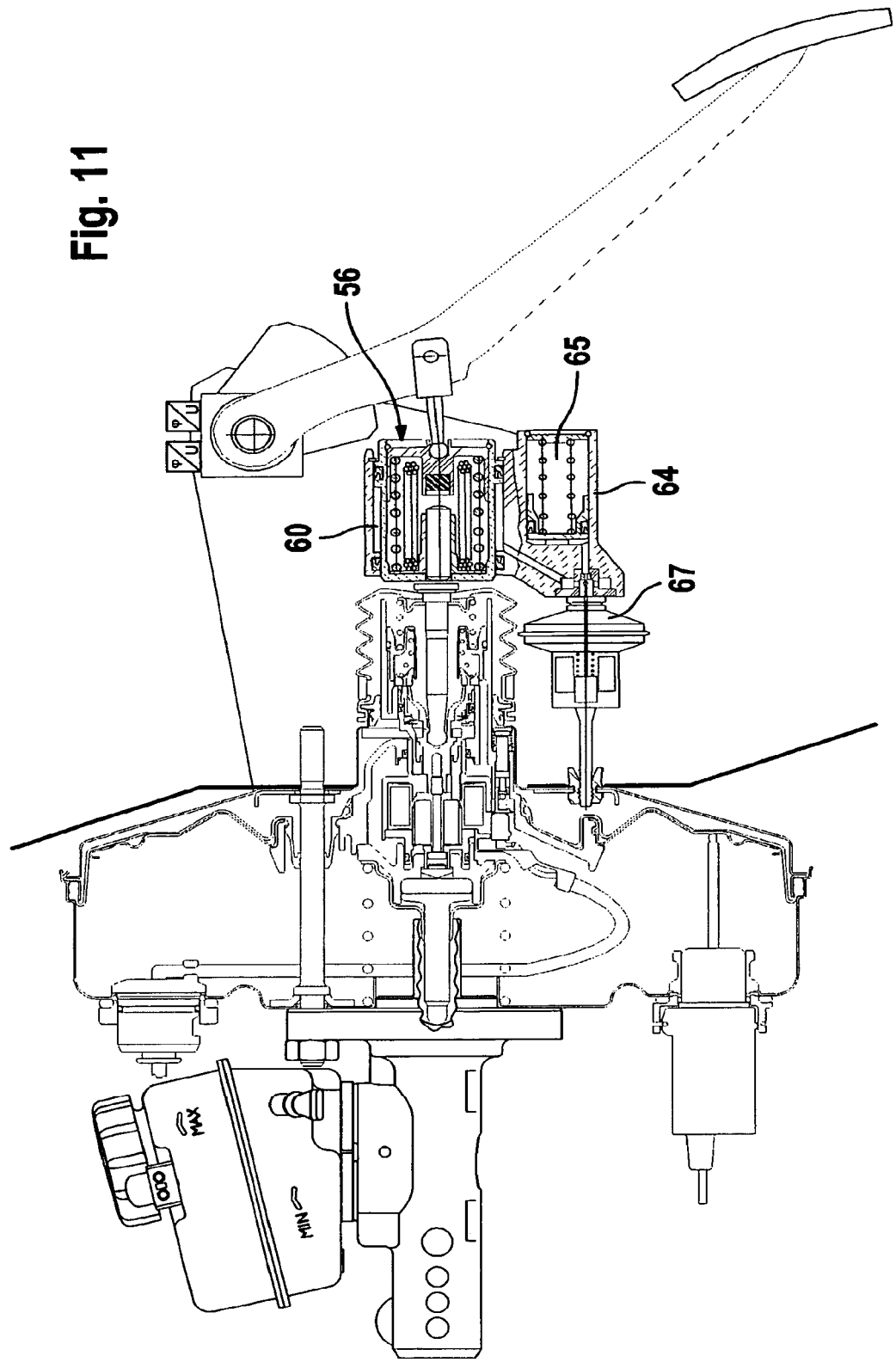
FIG. 11 shows a partial cross-sectional view of a seventh design of the brake actuating unit of the invention, where the activation and deactivation of the pedal travel simulator is executed by electrohydraulic means.

The structure of the designs shown in FIGS. 10 and 11 corresponds largely to the structure of the design according to FIG. 9. The above-mentioned hydraulic chamber 60, however, is designed in a housing 64 which radially embraces the simulator unit 56 and receives a low-pressure accumulator 65 to which chamber 60 is connected. The connection between chamber 60 and the low-pressure accumulator 65 is closable, like in the preceding example, by means of an electromagnetically operable valve 66 (FIG. 10) or an electro-pneumatically or pneumatically operable valve 67 (FIG. 11).

Figure 12:
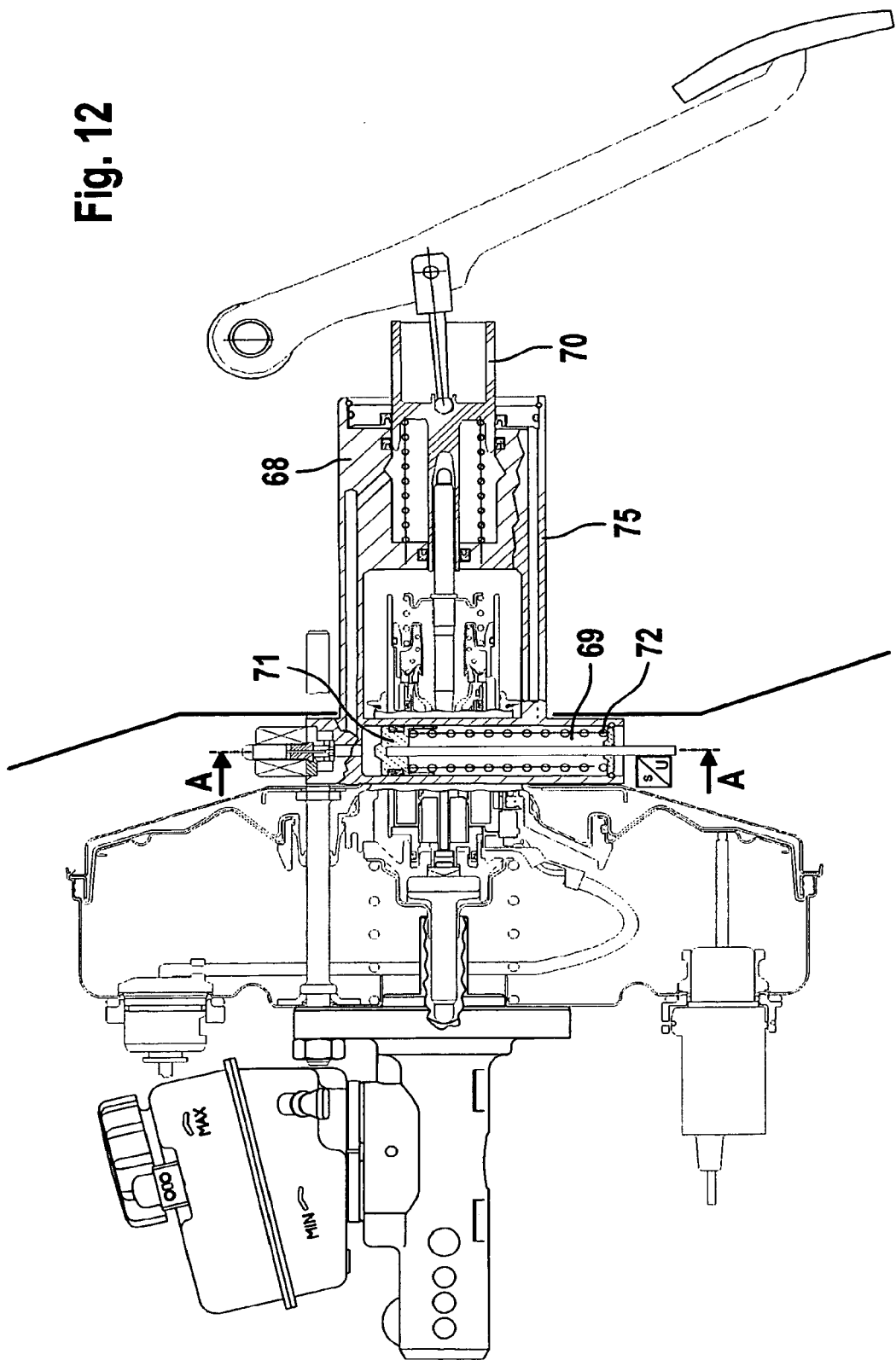
FIG. 12 shows a partial cross-sectional view of am eighth design of the brake actuating unit of the invention, where the activation and deactivation of the pedal travel simulator is executed by electrohydraulic means.
Figure 13:
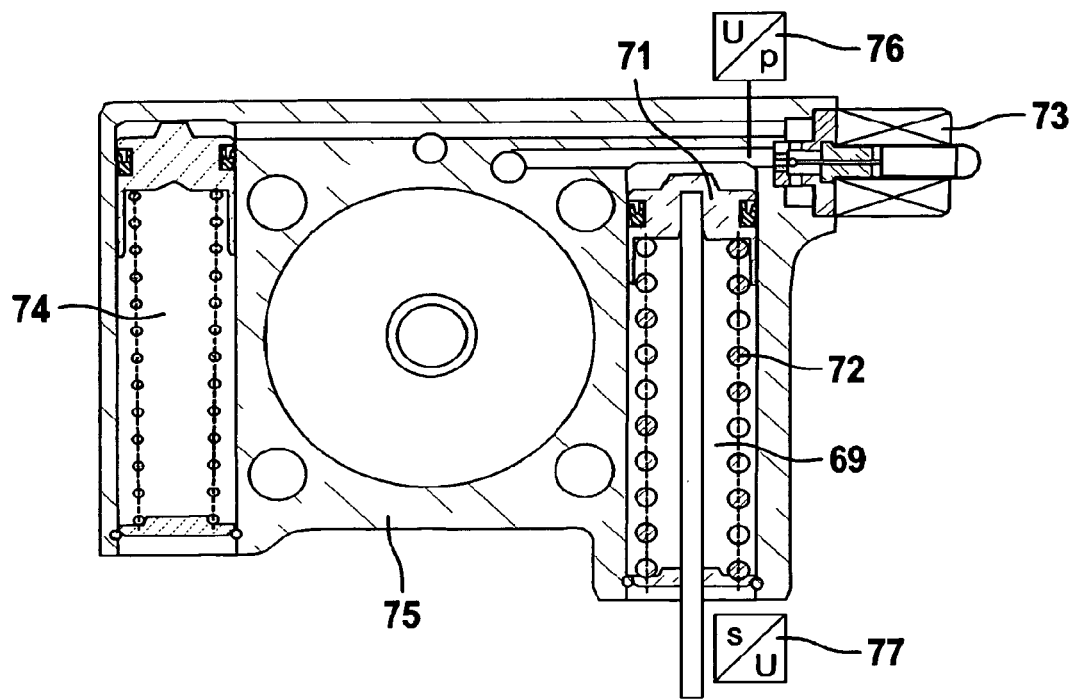
FIG. 13 is a cross-section taken along the line of intersection A-A through the brake actuating unit of FIG. 12.

The design version illustrated in FIGS. 12 and 13 is characterized in that the pedal travel simulator is formed of a hydraulic generating cylinder 68 operable by means of the brake pedal 1 and having a generating cylinder piston 70, as well as of a slave cylinder 69 connected downstream of the generating cylinder 68 and having a slave cylinder piston 71 biased by a simulator spring 72. Slave cylinder 69 is connected to a low-pressure accumulator 74 by way of a connection closable by means of an electromagnetically operable valve 73 (FIG. 13). Connected to the slave cylinder 69 is a pressure sensor 76 for sensing the pressure that prevails therein, while a travel sensor 77 is used to sense the position of the slave cylinder piston 71.

Like in the example mentioned above, the pedal travel simulator is designed in an adapter 75 that radially embraces the brake booster 3 at least in part and is used to supply air out of the engine compartment of the vehicle to the brake booster 3.

Figure 14A:
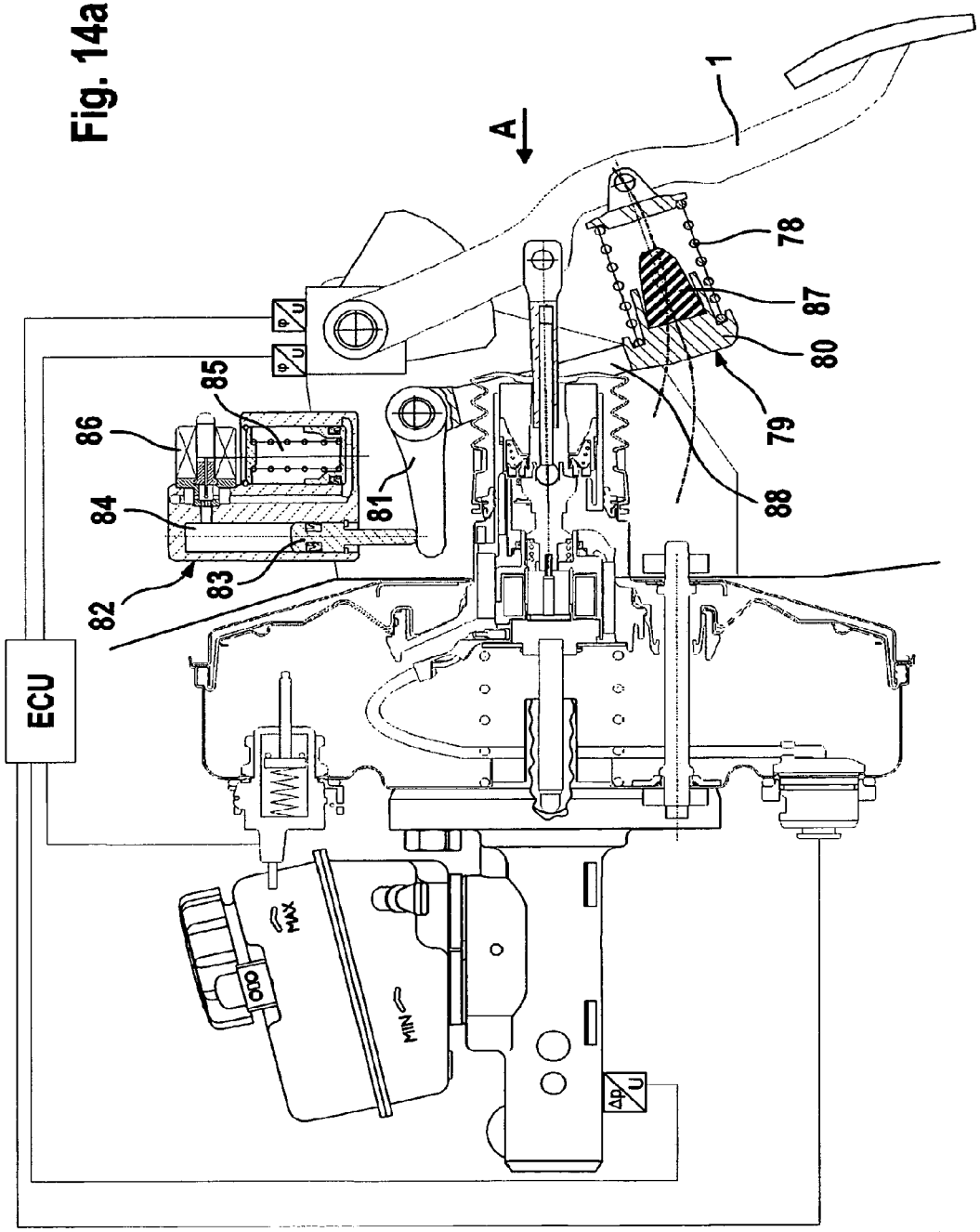
FIG. 14a shows a partial cross-sectional view of a ninth design of the brake actuating unit of the invention, where the activation and deactivation of the pedal travel simulator is executed by electrohydraulic means.
Figure 14B:
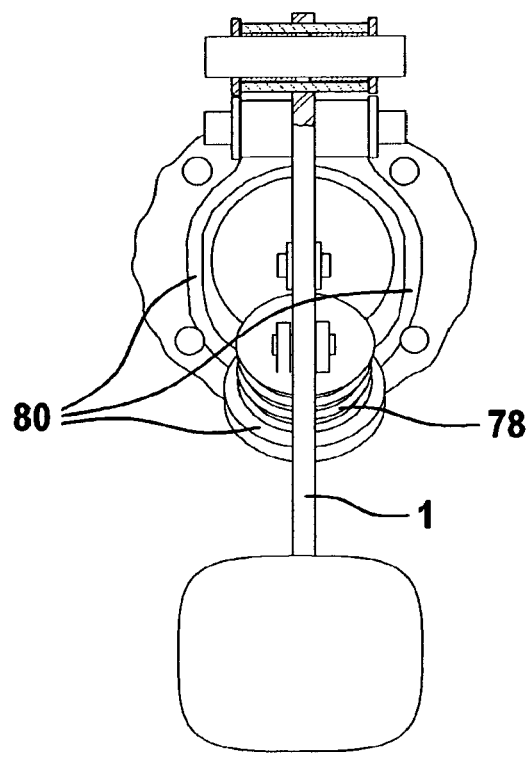
FIG. 14b is a partial view of the brake actuating unit according to FIG. 8a from the direction 'B'.

In the favorable embodiment illustrated in FIG. 14, the pedal travel simulator is formed of a compression spring 78 being compressed between the brake pedal 1 and a two-armed lever 79. The two-armed lever 79 is pivoted within limits and offset in relation to the brake pedal 1, and its first arm 80 forms a supporting surface for the compression spring 78, while its second arm 81 is supported on a hydraulic piston 83 of a piston-and-cylinder arrangement 82. The pressure chamber 84 of the piston-and-cylinder arrangement 82 is connected to a hydraulic low-pressure accumulator 85 by means of a hydraulic connection. Like in the preceding embodiments, an electromagnetically operable valve 86 is inserted into the hydraulic connection and permits closing the said connection.

The first arm 80 of the two-armed lever 79 which is furnished with an elastic stop means 87 for the brake pedal 1 includes an opening 88 which embraces at least in part the control housing of the brake booster 3 when the pedal travel simulator is disabled. A slightly modified design is of course also feasible, where the two-armed lever 78 is mounted coaxially with the brake pedal 1.

Figure 15:
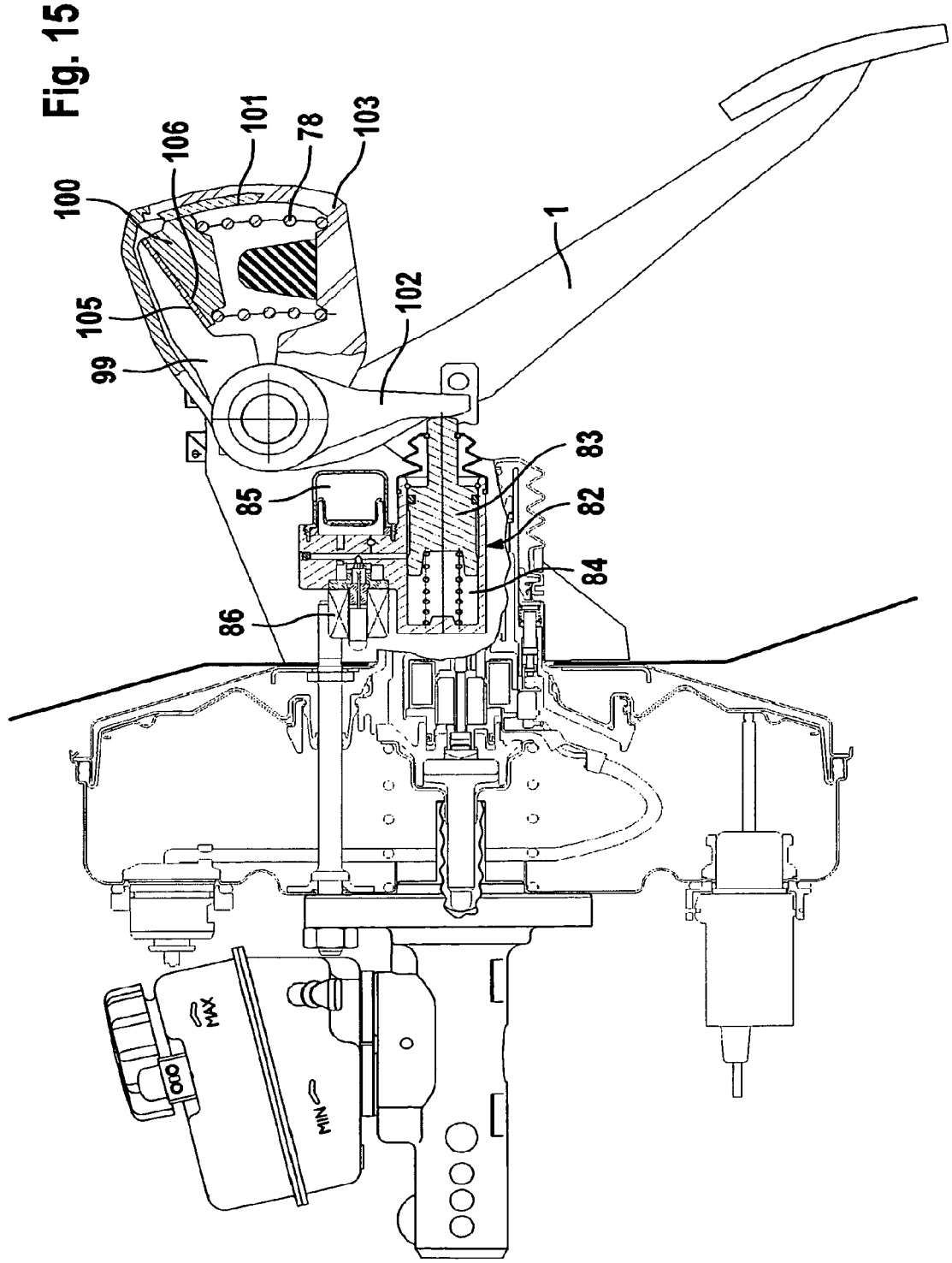
FIGS. 15 and 16 show a partial cross-sectional view of a tenth and an eleventh design of the brake actuating unit of the invention, where the activation and deactivation of the pedal travel simulator is executed by electrohydraulic means.
Figure 16:
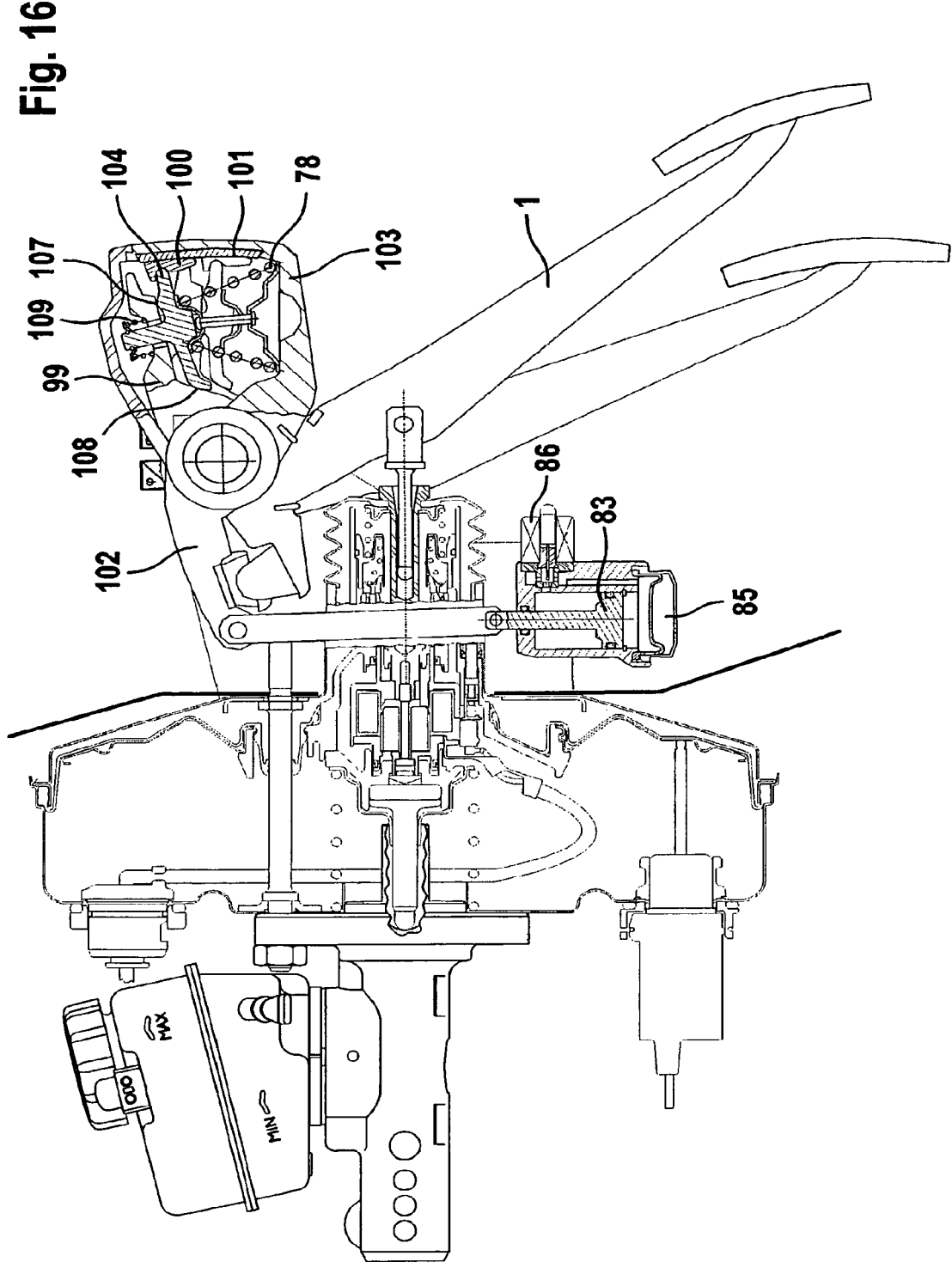

The structure of the designs of the actuating unit of the invention, as shown in FIGS. 15 and 16, corresponds largely to the structure of the design of FIG. 14. Like parts have been assigned like reference numerals. The mentioned Figures show two embodiments of the above-mentioned means to produce a hysteresis.

In the arrangement shown in FIG. 15, a force-transmitting lever 99 connected to the brake pedal 1 is provided, and a friction member 100 abuts on the lever under the effect of the simulator spring 78. Friction member 100 interacts with a friction surface 101. The abutment of the friction member 100 on the force-transmitting lever 99 is carried out by means of inclined abutment surfaces 105, 106 in such a fashion that, upon actuation of the pedal travel simulator 2, a force component develops which urges the friction member 100 against the friction surface 101. The above-mentioned elements 78, 99, 100, 101 are arranged preferably in a housing 103 which is mounted coaxially to the brake pedal 1 and has an arm 102 being supported on the hydraulic piston 83 of the piston-and-cylinder arrangement 82 mentioned with respect to FIG. 14.

In the design version shown in FIG. 16, the friction member 100 is arranged at a transmission lever 104 which is supported at two locations 107, 108 at the force-transmitting lever 99 in such a fashion that the force component is boosted which urges the friction member 100 against the friction surface 101. A tension spring 109 serves for the better positioning of the transmission lever 104. In addition to the elements mentioned before, the housing 103 in the design shown also accommodates the transmission lever 104 and the tension spring 109.

Figure 17:
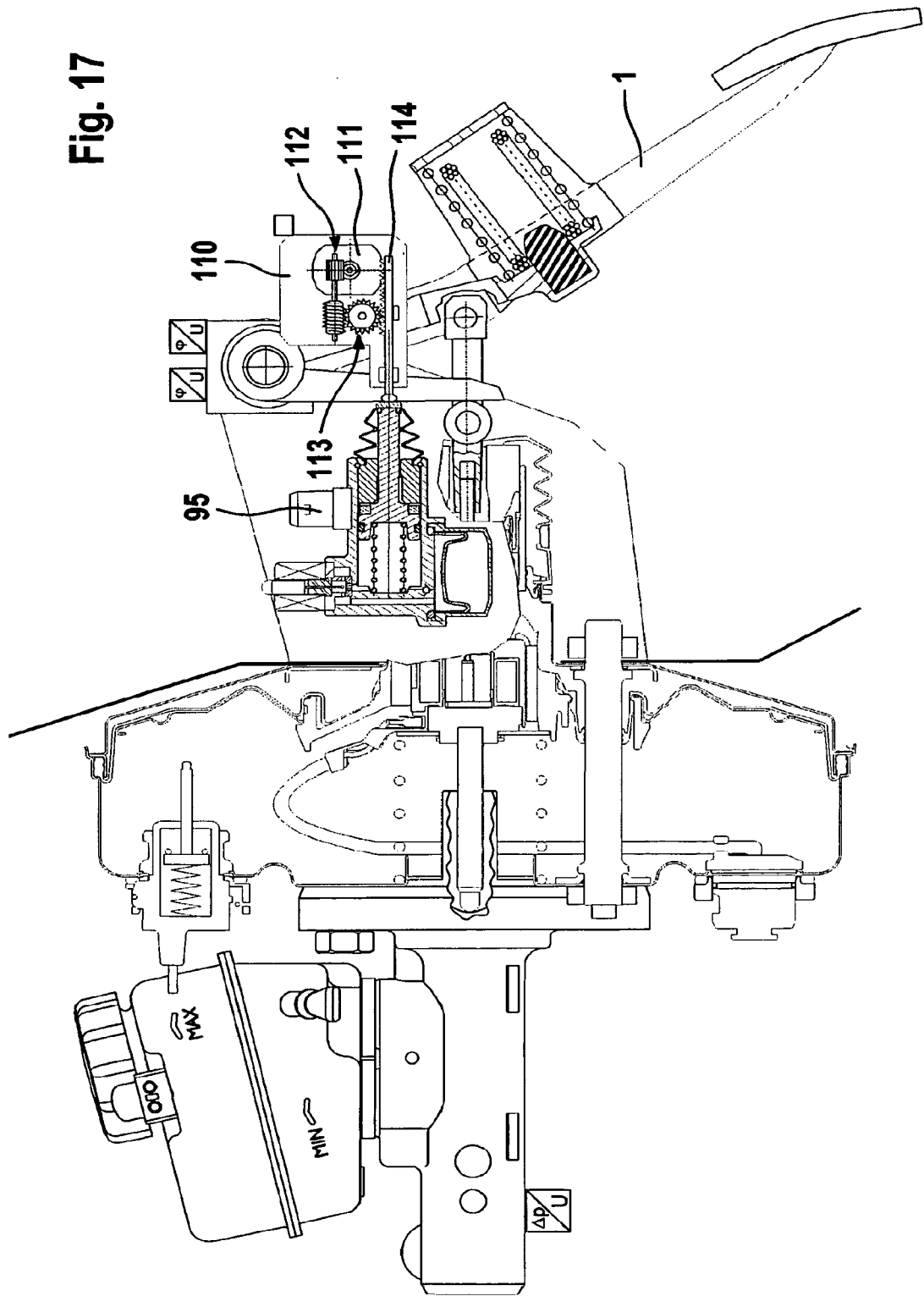
FIGS. 17 and 18 show a partial cross-sectional view of a twelfth and a thirteenth design of the brake actuating unit of the invention, where the activation and deactivation of the pedal travel simulator is executed by electrohydraulic means.
Figure 18:
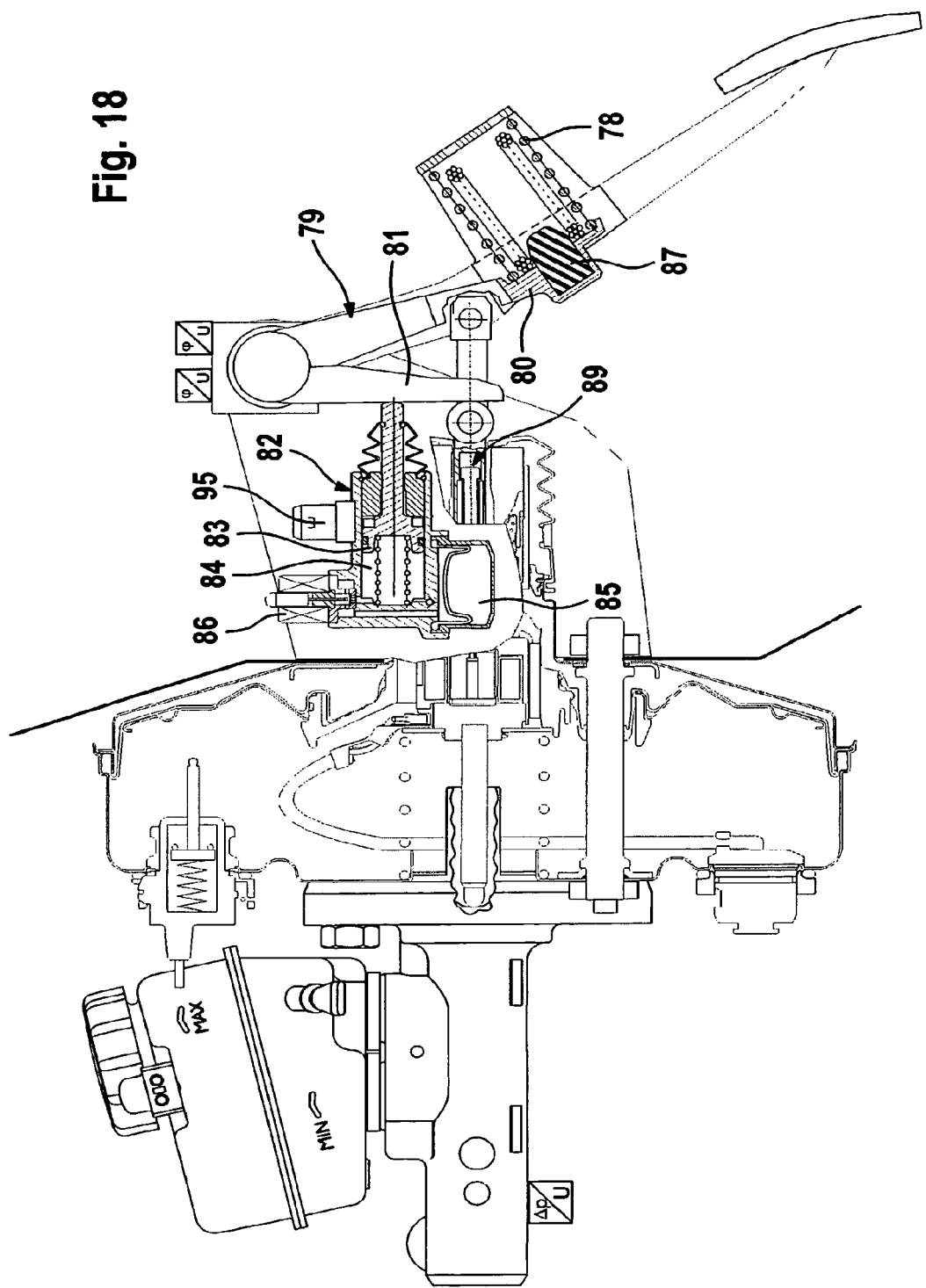

In the embodiments illustrated in FIGS. 17 and 18, the structure of which also corresponds to the design of FIG. 14 to a large extent, a means is provided enabling to check the movability of the hydraulic piston 83 or the function of the shut-off valve 86.

In the version shown in FIG. 17, a schematically indicated mechanical coupling 89 is provided between the brake booster 3 and the brake pedal 1, allowing the transmission of a tension force generated by the brake booster 3 to the brake pedal 1 and, thus, to the piston 83 by means of the simulator spring 79 and the two-armed lever 79. A sensor device 95, which may be configured as a Hall sensor, for example, senses the movement of the piston 83, when the system is intact. This movement is, however, only possible when the shut-off valve 86 opens the hydraulic connection between the pressure chamber 84 and the low-pressure accumulator 85.

In the version shown in FIG. 18, however, there is provision of an electromechanical driving unit 110 which permits actuating the piston 83 irrespective of the brake pedal 1. As can be seen in the drawings, the driving unit 110 basically comprises an electric motor 111, two transmission steps 112, 113 as well as a toothed rack 114 which is in engagement with the driving element of the second transmission step 113 and, on account of its translational motion, brings about displacement of the hydraulic piston 83. It is, however, also feasible to use a pneumatic driving unit (not shown) for the same purpose.

Figure 19:
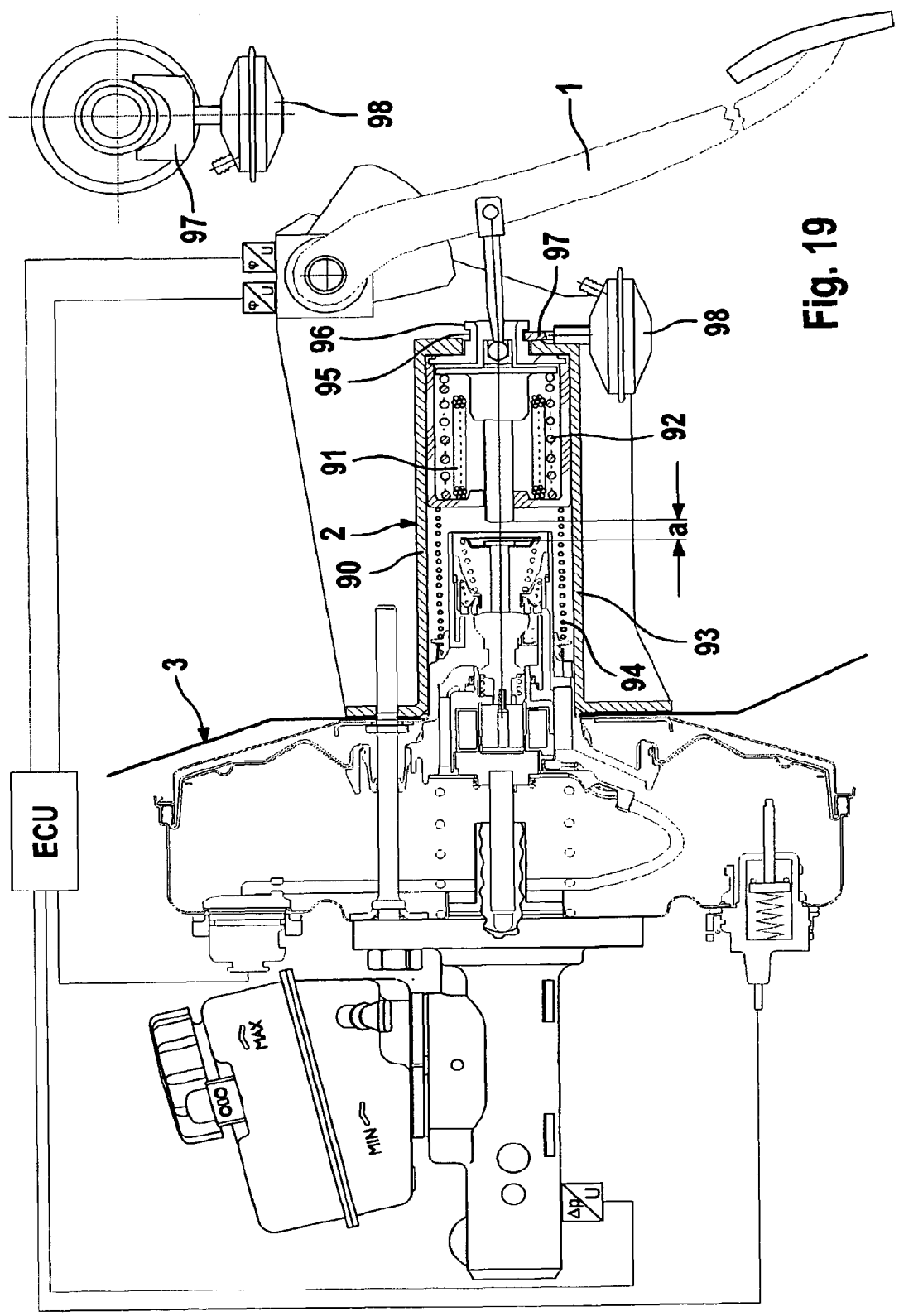
FIG. 19 shows a partial cross-sectional view of a design of the brake actuating unit of the invention, where the activation and deactivation of the pedal travel simulator is executed by vacuum-operated means.

FIG. 19 eventually shows a design version of the actuating unit of the invention where the pedal travel simulator 2 is enabled and disabled by a means being operable pneumatically, preferably by way of vacuum, said means being a vacuum source provided in the vehicle, e.g. a vacuum pump. The pedal travel simulator 2 is configured as a movable simulator unit 90 in the example shown, which is arranged in the flux of forces between the brake pedal 1 and the brake booster 3, preferably coaxially relative to said, and accommodates two compression springs 90, 91 arranged coaxially to each other. In this arrangement, the simulator unit 90 is preferably guided displaceably in a cylindrical component 93 which accommodates the control housing of the brake booster 3 that contains a pneumatic control valve, as well as a resetting spring 94 biasing the pedal travel simulator 2 in opposition to its actuating direction. The simulator unit 90 includes at its end projecting from the cylindrical component 93 an axial extension 95 with a radial collar 96 with which an arresting element 97 cooperates.

The arresting element 97 is actuated by a vacuum box 98 in such a fashion that the collar 96 is retained by the arresting element 96 in the 'brake-by-wire' operating mode and is released by said outside the 'brake-by-wire' operating mode, e.g. upon failure of the vacuum source.

The brake pedal can, of course, also be adjustably arranged in all designs explained herein.

What is claimed is:

1. A brake actuating unit for actuating a motor vehicle brake system of the 'brake-by-wire' type comprising:
a brake booster which is operable by a brake pedal and by an electronic control unit, and a device is provided to decouple a force-transmitting connection between the brake pedal and the brake booster in the 'brake-by-wire' operating mode;
a master brake cylinder connected downstream of the brake booster;
a device to detect a deceleration request of a driver; and
a pedal travel simulator which interacts with the brake pedal and due to a resetting force acting on the brake pedal can be simulated in the 'brake-by-wire' operating mode independently of an actuation of the brake booster, and which can be enabled in the 'brake-by-wire' operating mode when the force-transmitting connection between the brake pedal and the brake booster is decoupled and can be disabled outside the 'brake-by-wire' operating mode, wherein the pedal travel simulator is enabled and disabled by one or more electrohydraulic devices and includes a friction member that interacts with a friction surface to generate a force biased against movement of the brake pedal.

2. A brake actuating unit according to claim 1, wherein the one or more electrohydraulic devices is drivable by the electronic control unit.

3. A brake actuating unit according to claim 1, wherein the pedal travel simulator includes at least one simulator spring, and at least one the electrohydraulic devices is formed of a hydraulic cylinder-and-piston arrangement that is closable by an electromagnetically, pneumatically or electro-pneumatically operable valve, and a force-transmitting element is interposed between the piston of the cylinder-and-piston arrangement and the simulator spring, abutting on which element is a supporting surface for the simulator spring.

4. A brake actuating unit according to claim 3, wherein the piston-and-cylinder arrangement and the force-transmitting element are arranged in a manner radially offset relative to the axis of the brake booster.

5. A brake actuating unit according to claim 3, wherein the piston-and-cylinder arrangement includes a resetting spring preloading the force-transmitting element in opposition to the actuating direction of the brake pedal.

6. A brake actuating unit according to claim 3, wherein the simulator spring is received in a simulator unit arranged between the brake pedal and the brake booster, the simulator unit is configured as a hydraulic piston and forms a closable hydraulic chamber and the hydraulic chamber is connected to a low-pressure accumulator.

7. A brake actuating unit according to claim 6, including an adapter that radially embraces the brake booster at least in part and is used for the supply of air to the brake booster out of the engine compartment of the vehicle.

8. A brake actuating unit according to claim 6, wherein the hydraulic chamber is closable by means of an electromagnetically, electro-pneumatically or pneumatically operable valve.

9. A brake actuating unit according to claim 1, wherein the pedal travel simulator is formed of a hydraulic generating cylinder operable by the brake pedal and a hydraulic slave cylinder connected downstream of the generating cylinder and having its piston preloaded by the simulator spring, with the generating cylinder being closed by way of a connection to a low-pressure accumulator that can be closed by a valve.

10. The brake actuating unit according to claim 1, wherein a force transmitting lever is connected to the brake pedal and abuts the friction member in response to movement of the brake pedal to move the friction member into engagement with the friction surface.

11. The brake actuating unit according to claim 10, including a simulator spring that biases the friction member against the lever and movement of the brake pedal.

12. The brake actuating unit according to claim 11, including an arm providing a link between the brake pedal and the lever and engaging a hydraulic piston within a pressure chamber.

13. The brake actuating unit according to claim 12, including a valve for controlling hydraulic communication between the pressure chamber and an accumulator.

* * * * *